LINE CONCENTRATING TELEPHONE SYSTEM

Filed June 16, 1959 5 Sheets-Sheet 1

INVENTOR
B. W. LEE
BY
ATTORNEY

INVENTOR
B. W. LEE
BY [signature]
ATTORNEY

INVENTOR
B. W. LEE
BY [signature]
ATTORNEY

INVENTOR
B. W. LEE
BY
[signature]
ATTORNEY

LINE CONCENTRATING TELEPHONE SYSTEM

Filed June 16, 1959 5 Sheets-Sheet 5

INVENTOR
B.W. LEE
BY [signature]
ATTORNEY 3,073,906

LINE CONCENTRATING TELEPHONE SYSTEM

Bock W. Lee, Berkeley, Calif., assignor to Bell Telephone Laboratories, Incorporated, New York, N.Y., a corporation of New York Filed June 16, 1959, Ser. No. 820,640
18 Claims. (Cl. 179—18)

Figure 1:
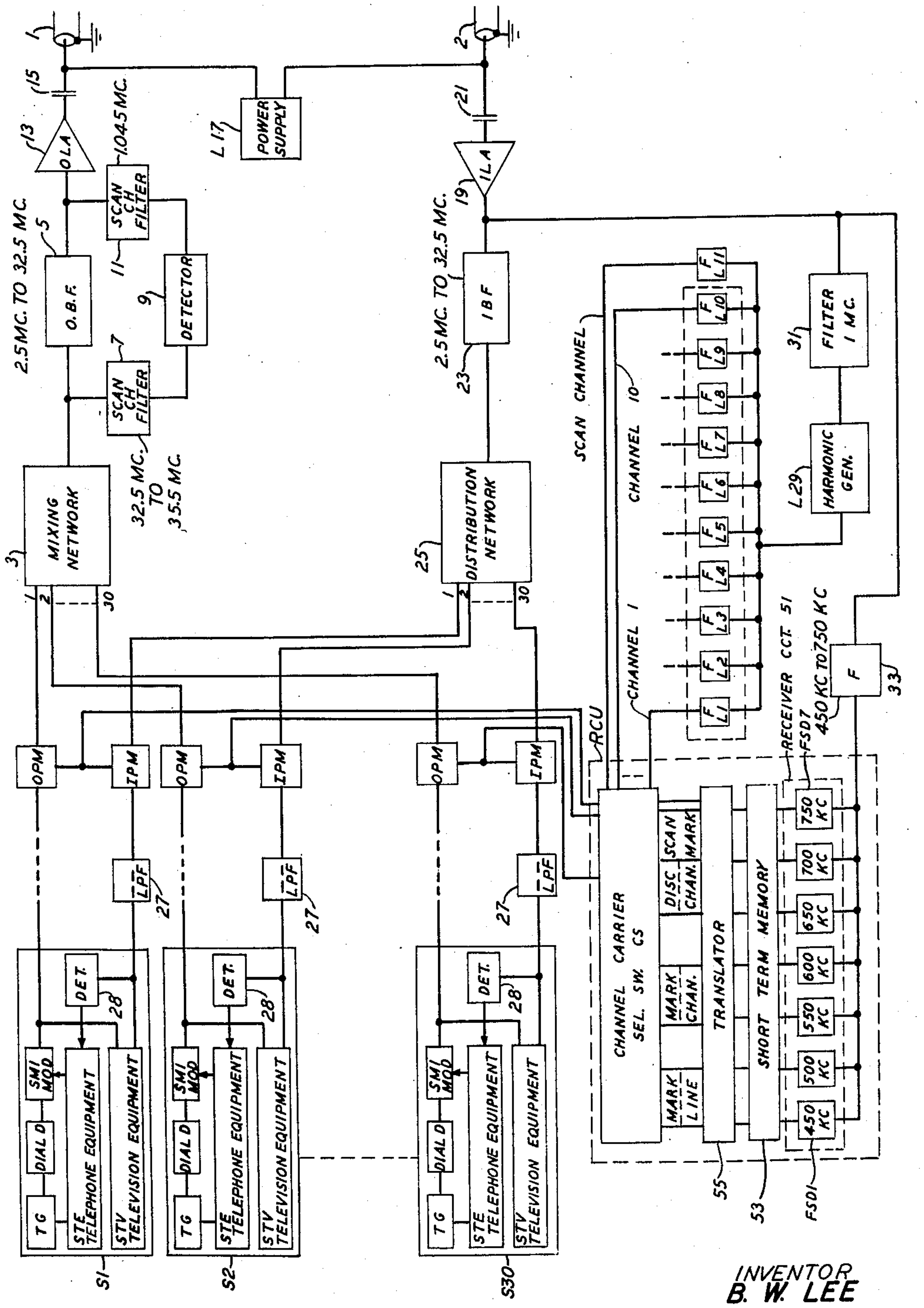

This invention relates to telephone systems and more particularly to line concentrating telephone carrier systems for providing broad-band two-way communication between served substations.

A line concentrating telephone system is normally defined as one in which the cost of the outside plant serving a group of substations is reduced by disbursing a portion of the central office switching equipment to a remote location to avoid the necessity of individually connecting each substation to a central office location by a pair of metallic conductors. The line concentrating unit which performs the remote switching operation operates as a slave unit directly controlled by the central office to concentrate the traffic from a number of substations through a fewer number of communication channels extending from the central office. The function of the line concentrating unit is to selectively establish a communication link between the substation requesting service and an available communication channel to the central office. All decisions are made by the central office for those operations to be performed by the line concentrating unit necessary for establishing a communication link to provide service to a requesting substation. Accordingly, the line concentrating unit has an operation which is passive wi.h respect to the central office. Such a system is, for example, shown in A. E. Joel, Jr., et al. Patent 2,812,385, issued November 5, 1957.

In line concentrating telephone systems of the type wherein communication is over metallic conductors, the allowable bandwidth for signal transmission is of the order of approximately 3,000 cycles. This is also true for conventional telephone systems which do not utilize line concentrating units. However, present day demands upon telephone equipment are necessitating increased efforts to provide telephone service with broad-band facilities. These efforts have been necessitated by advances which have been made in many technical fields. An example of such an advance is in the field of data processing where it may be desired that information accumulated at one location be processed at another location. To attempt a transmission of such collected information over metallic conductors having an available bandwidth of a few thousand cycles may affect the transmitted data such as to produce inaccurate final results. Another example is to be found in the transmission of composite intelligence signals, i.e. visual and aural intelligence signals. There are numerous examples of broad-band communication systems for simultaneously transmitting both visual and aural information between substations but none of these systems are practicable because a separate and expensive broad-band communication medium is required from each substation to the central office. For example, the copending applications of F. K. Becker, Serial Nos. 506,235 and 600,244, filed May 5, 1955 and July 26, 1956, respectively, the former having since matured into U.S. Patent 2,878,310 on March 17, 1959, and the latter having matured in U.S. Pat. 2,909,600 M. A. Clark et al., Serial No. 525,927 filed on August 2, 1955 and since matured into U.S. Patent 2,922,843 on January 26, 1960, disclose apparatus for simultaneously transmitting both visual and aural information.

The metallic transmission lines employed in present day telephone systems in most cases cannot be adapted for the simultaneous transmission of both visual and aural intelligence inasmuch as they would present to a broad-band signal a high stray capacitance factor coupled with an unacceptable attenuation. To attempt an independent transmission of visual intelligence would necessarily require a duplication of switching facilities and the provision in the over-all system of broad-band communication facilities. While it is not intended that the visual image provided to telephone subscribers be of commercial quality requiring a bandwith of four megacycles, a minimum bandwidth of approximately one megacycle for such service would be required to provide sufficient image detail.

Another problem which would occur if broad-band signals are transmitted through present day telephone systems is that of crosstalk or spill between the individual communication channels. The switching operation in such systems is, generally, performed through the agency of mechanical switches wherein a connection or junction of lines is effected by the closure of mechanical elements. Such systems may, for example, employ a crossbar switch of the type disclosed in A. J. Busch Patent 2,585,904, issued February 19, 1952. If a high frequency signal is directed to a crossbar switch, it would be multiplied to other crossbar switches in addition to the selected crossbar switch as such switches are arranged in switching frames. A high frequency signal fed to such switching frame would appear over more than one conductor connected thereto due to the stray capacitance inherent in mechanical switches. As the transmission of aural intelligence normally requires a bandwidth of three kilocycles, the problem of crosstalk is not as acute as when dealing with high frequency visual intelligence of the order of one megacycle.

An object of this invention is to provide an automatic telephone system for effectively transmitting a broad-band composite intelligence signal.

Another object of this invention is to provide a line concentrating telephone system wherein a plurality of communication channels are selectively provided to serve a larger plurality of substations.

Yet another object of this invention is to provide a line concentrating telephone system wherein carrier multiplexing may be incorporated.

Still another object of this invention is to eliminate the possibility of crosstalk in a telephone system adapted for wide-band operation.

A further object of this invention is to provide a practical telephone system capable of simultaneously transmitting both visual and aural information.

These and other objects are achieved by providing a telephone carrier system including a pair of broad-band high frequency communication media each comprising a plurality of frequency divided communication channels of sufficient bandwidth for the transmission of wide-band or composite intelligence signals which are made selectively available to a larger plurality of substations. Servicing a plurality of substations through a lesser plurality of communication channels extending from the central office is effected by a line concentrating unit operating under the direct control of a central office to provide a communication link between a substation requesting service and an idle communication channel. A feature of this invention, therefore, relates to the provision of a line concentrating unit whereby a larger plurality of substations may be served by a smaller number of communication channels. The communication link is established by the line concentrating unit through a frequency switching operation which di.tributes the composite intelligence signals to be transmitted from the individual substations along particular communication channels comprising discrete portions of the frequency spectrum of the communication medium.

The frequency switching operation is performed by the line concentrating unit by applying a same channel carrier signal associated with an idle communication channel to a modulator and a demodulator unit associated with each individual substation. The carrier signal is not permanently assigned to an individual substation but is rather selectively allotted by the central office through the agency of the line concentrating unit. Accordingly, the modulator and demodulator units at each of the plurality of substations serve as switching devices to provide a communication link between an individual substation and a communication channel. Accordingly, an additional feature of this invention relates to the provision of modulator and demodulator units to perform switching operations thereby eliminating the necessity of employing mechanical type switching devices. The modulator and demodulator units during a period of non-application of carrier signal operate to effectively isolate their individual associated substations from the system. A communication connection is only established when a channel carrier signal is applied to the modulating and demodulating units of an individual substation. Another feature of this invention is the provision of means to provide a two-way communication connection between an individual substation and a central office by the application of a single channel carrier signal to the modulator and demodulator units of the individual substation. The application of a second channel carrier signal to the modulating and demodulating units associated with a called substation provides that a communication connection can be effected for two-way communication between a calling and a called substation through the central office equipment.

The outgoing composite intelligence signals from each of the calling and the called substations are double modulated, or provided with a subcarrier signal, the presence of a subcarrier signal providing a detectable line condition by which supervision of the call condition of each substation by the central office may be effected. Still another feature of this invention is the provision of means to detect this subcarrier signal to determine the line condition of each individual substation. The subcarrier signal is generated whenever a substation is in an off-hook condition. For service request detection, a temporary communication connection is provided between a particular substation and the central office by a scanning frequency carrier which is modulated by the subcarrier signal. The presence of the subcarrier signal at the central office indicates that the particular substation is in an off-hook condition and service is requested. If a communication link has been established, the continuous presence of the subcarrier signal indicates that service is still required. Dial pulses are recognized by the central office equipment by detecting the absence of such subcarrier signal as interrupted by the dialing operation.

The line concentrating unit of the present invention can be employed with substantially the same central office equipment as set forth in the copending patent application of W. A. Budlong et al., Serial No. 688,386, filed October 7, 1957, now U.S. Patent 2,955,165. Such central office equipment provides for a constant supervision of the call condition of each of the served substations. A "stored program" is provided for the central office equipment to provide a self-propagating operation therefor. The central office equipment directs commands to the line concentrating unit to perform those operations required under a given group of circumstances. Upon the determination of the appropriate operations to be performed, commands are sent out from the central office to the line concentrating unit in the form of parallel polytonic tones representing a binary word along the baseband or lower portion of the frequency spectrum of the communication medium. Yet another feature is the provision of a line concentrating unit remotely located from a central office and responsive to a group of polytonic tones transmitted therefrom to perform required operations.

In addition to the equipment substantially set forth in the above-identified W. A. Budlong et al. application, channel filtering and demodulation is provided at the central office for each of the communication channels in the incoming communication medium. A plurality of composite intelligence signals which were each simultaneously directed from the individual substations are thereby separated for further distribution. If the composite intelligence signal is to be directed as an intraconcentrator call, i.e., between substations served by a same line concentrating unit, communication is provided to the called substation on a second or different channel carrier than previously allocated to the calling substation. Accordingly, each intraconcentrator call connection requires who communication channels in each of the pair of broad-band high frequency communication media, i.e., a two-way communication connection is provided on a "four-wire" transmission basis. If, however, the composite intelligence signal is to be directed as an interconcentrator call, i.e., between substations served by different line concentrating units, communication may be provided on either a same or a different channel carrier peculiar to each of the line concentrating units serving the calling and the called substations, respectively. In addition, broad-band intelligence signal may be directed as an interexchange call on a non-carrier basis from the central office over suitably adapted broad-band communication media. A further feature of this invention relates to the provision of a single oscillator to provide a base frequency for the development of identical pluralities of channel carrier frequencies at both the central office and line concentrating unit locations.

Figure 2:
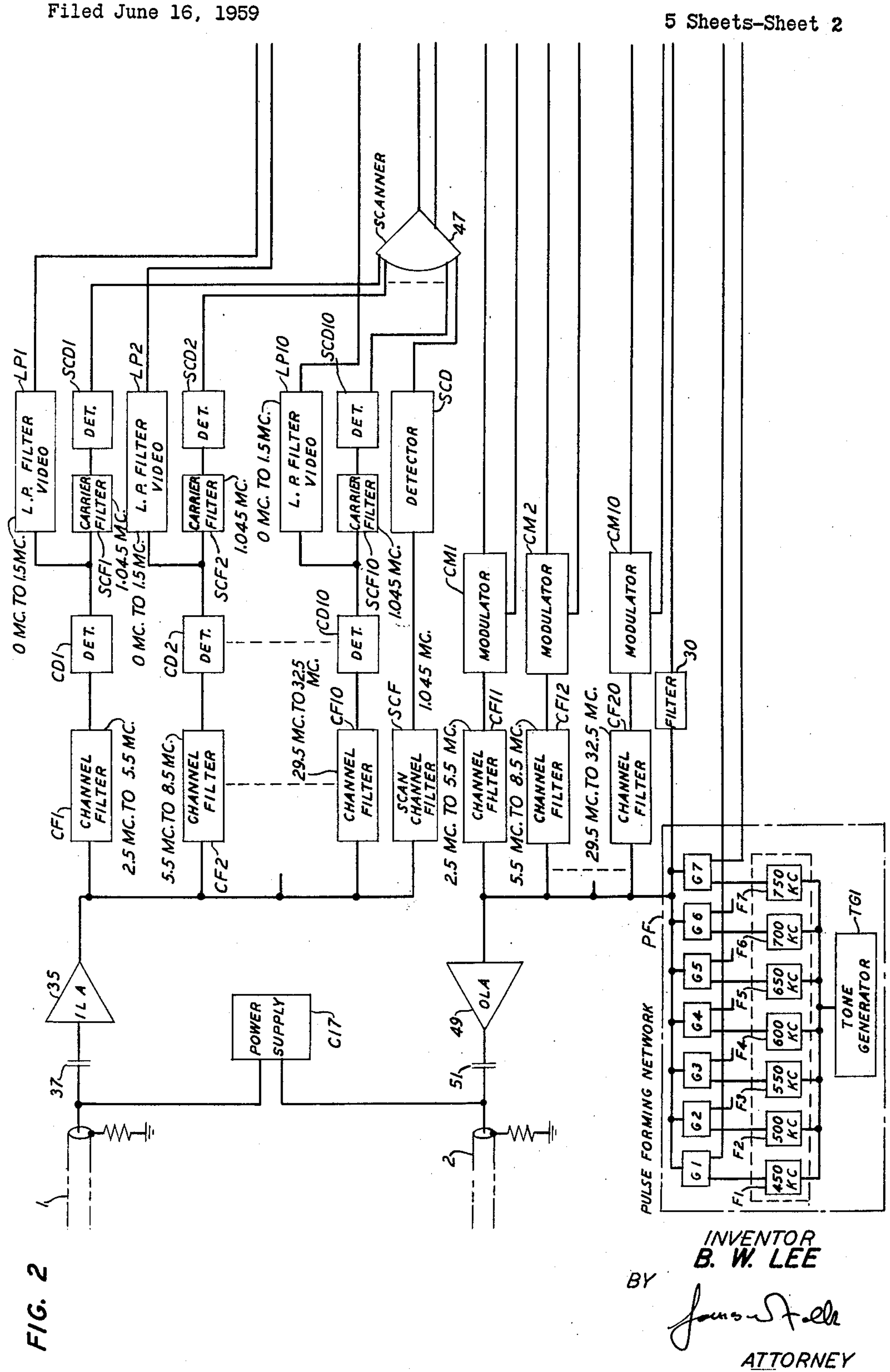
Figures 3, 7:
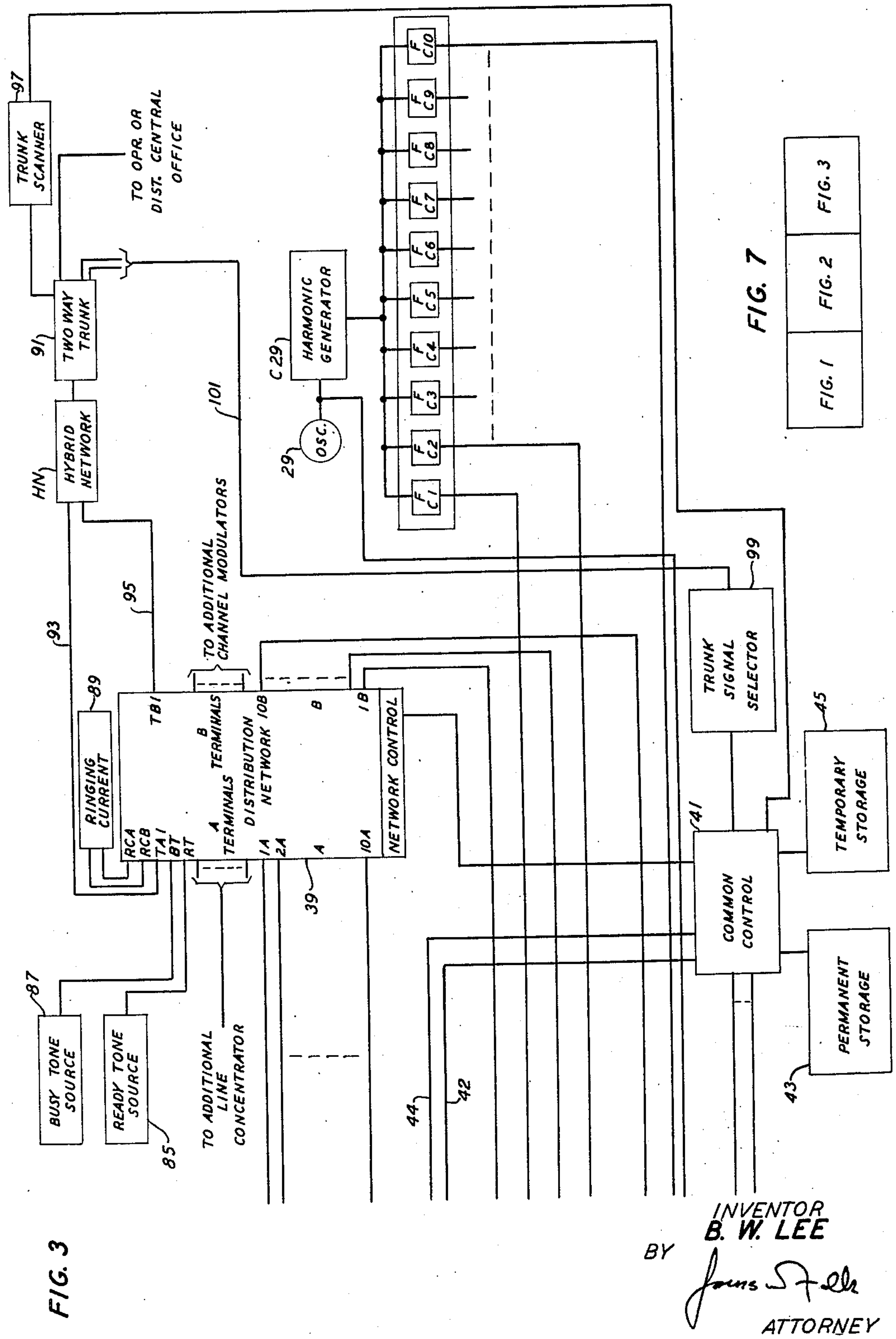
Figure 4:
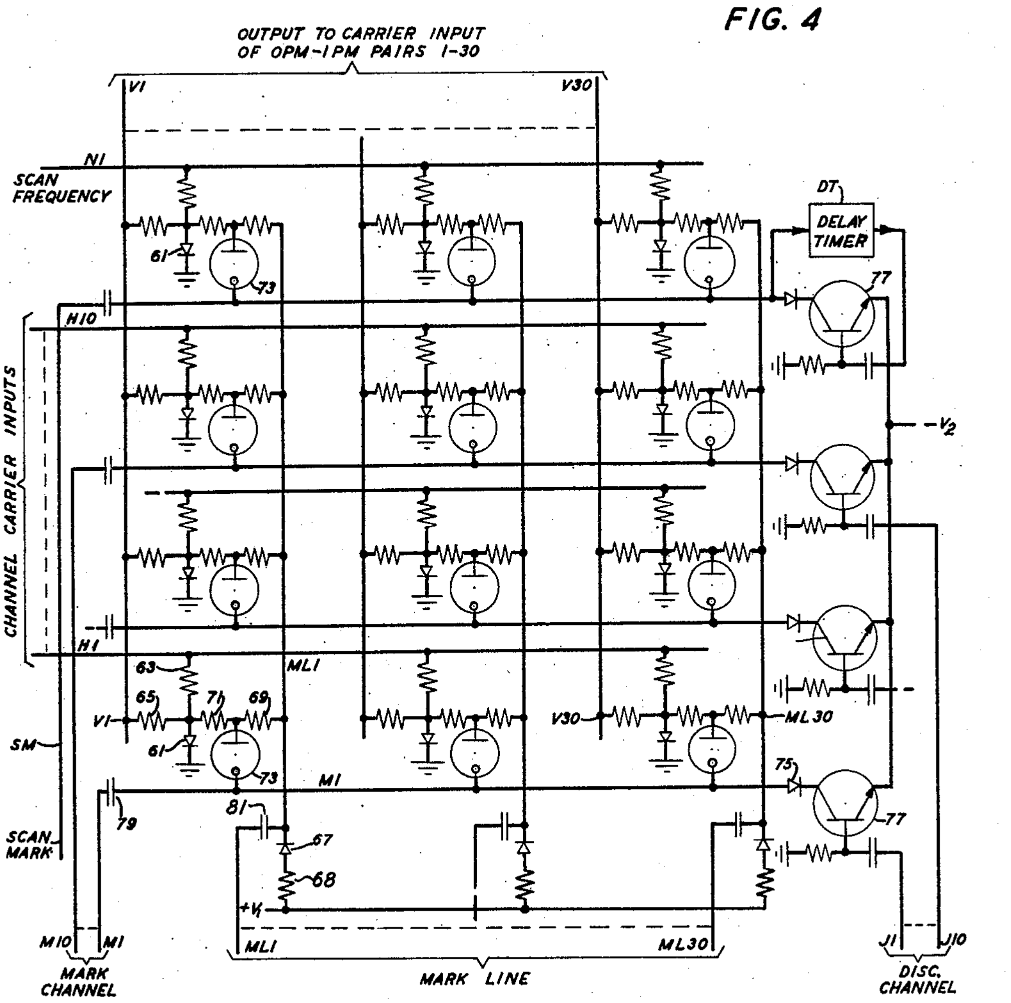
Figure 6:
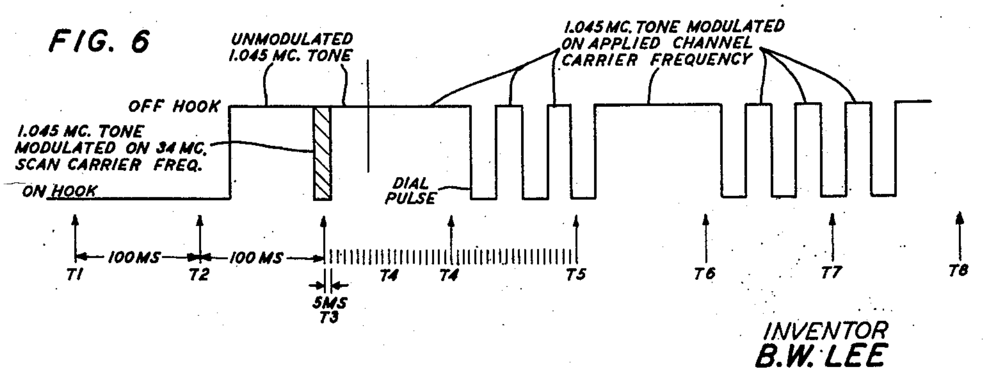
Figure 5:
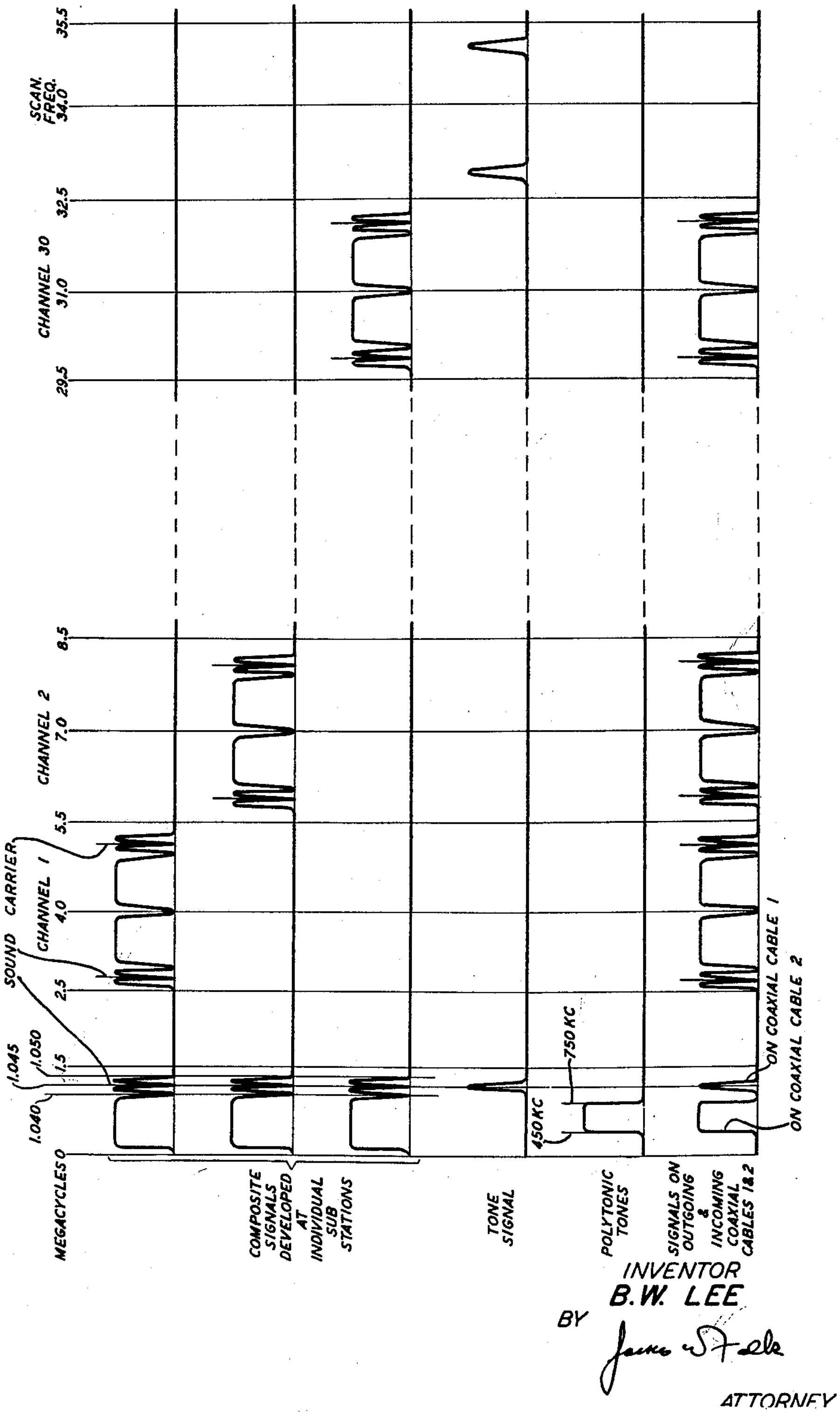

Additional objects and features will become apparent upon consideration of the following description taken in conjunction with the drawings, wherein:

FIGS. 1, 2 and 3 are general circuit representations of a telephone system adapted for the transmission of both visual and aural information and illustrating one specific embodiment of the invention. FIG. 1 shows the line concentrating portion of the system which is remotely located from the central office. FIGS. 2 and 3 show that portion of the system which comprises the central office equipment. FIGS. 1, 2 and 3 are arranged together as shown in the key diagram of FIG. 7;

FIG. 4 illustrates a channel carrier selector switch shown in FIG. 1 in block representation;

FIG. 5 illustrates the spacial distribution of the carrier frequencies and tone signals employed in the illustrated embodiment of FIGS. 1, 2 and 3 and their distribution along the frequency spectrum of each of the incoming and outgoing communication channels; and FIG. 6 is a time diagram which illustrates the scanning operation for the determination of the call condition of a substation and the detection of dialing pulses therefrom.

*General Description*

Referring particularly to FIGS. 1, 2 and 3, a line concentrating telephone carrier system is shown which is capable of providing visiphone communication, i.e., combined visual and aural communication, to a group of substations S1–S30. While the illustrated embodiment provides service to 30 substations, it is to be understood that the number of substations may vary depending upon estimated traffic requirements without deviating from the concepts of this invention. Although the illustrated embodiment of this invention is to be described as a visiphone communication system, it is to be also understood that the principles therein contained are equally applicable to a system for the transmission of any form of intelligence, e.g., aural intelligence alone, which may be modulated on a carrier signal for transmission along one of a plurality of communication channels contained in a communication medium. The equipment which is shown in FIG. 1 is located remotely from the central office and comprises the line concentrating unit of the system. It is to be further understood that more than a single line concentrating unit as depicted in FIG. 1 may be associated with a single central office as shown in FIGS. 2 and 3.

Communication connection is between the line concentrating unit of FIG. 1 and the central office of FIGS. 2 and 3 through a pair of coaxial cables 1 and 2. Coaxial cables 1 and 2 are adapted to carry outgoing and incoming intelligence signals, respectively, with respect to individual ones of substations S1–S30. Coaxial cables 1 and 2 are of a high quality type as to pass a wide frequency spectrum and be virtually unaffected by external influences. Each of the coaxial cables 1 and 2 provides ten communication channels for the transmission of a same number of composite intelligence signals, respectively. The combined bandwidth of the ten channels is 30 megacycles and extends along the frequency spectrum of each of coaxial cables 1 and 2 from 2.5 megacycles to 32.5 megacycles as depicted in FIG. 5. The channel carrier frequencies provided for the transmission of the outgoing and incoming composite intelligence signals are distributed along the frequency spectrum of the coaxial cables 1 and 2. Accordingly, each communication channel in the coaxial cables 1 and 2 is provided with a bandwidth of three megacycles for the transmission of a composite intelligence signal modulated upon a corresponding channel carrier frequency. The bandwidth allocated for the transmission of composite intelligence signals in each of the coaxial cables 1 and 2 may be extended if a greater number of communication channels are desired.

Identical apparatus is provided at each of the substations S1–S30 for the generation and reception of the composite intelligence signal. The equipment located at each of the substations S1–S30 may be substantially of the type described in the copending patent application F. K. Becker, Serial No. 600,244, filed July 26, 1956, and W. E. Kock et al. Serial No. 459,300, filed September 30, 1954, now U.S. Patent 2,895,005, both of which are entitled "Two-Way Television over Telephone Lines." That portion of each of the substations S1–S30 designated STE includes conventional telephone transmitting and receiving equipment and provides for the transmission and the reception of the aural intelligence signal. As such equipment is commonly known in the art, a detailed description thereof is not deemed necessary. In that portion of each of the substations S1–S30 designated STV is located a scene pick-up device, e.g., a miniature camera tube, and an image forming device, e.g., a miniature picture tube, to generate the visual intelligence signals for transmission and to create an image in response to received visual intelligence signals. A television signal of commercial quality normally requires a bandwidth of four megacycles. However, a bandwidth of approximately one megacycle would provide sufficient picture detail to transmit and create an image of acceptable quality. Accordingly in the illustrated embodiment, a bandwidth of 1.01 megacycles is allowed for the transmission of the visual intelligence signal.

Also, included at each of these substations S1–S30 is a tone generator TG. The tone generator TG can be of conventional oscillator design adapted to generate a 1.045-megacycle tone. As is further explained hereinafter, the presence or absence of the 1.045-megacycle tone is sensed at the central office to indicate the call condition of each of the substations S1–S30. The tone generator TG is adapted to be operative whenever the substation associated therewith is in an off-hook condition. Both the tone generator TG and the transmitting portion of the telephone equipment STE are normally connected to a modulator SM1, the tone generator TG being connected through a dialing device D which is operative to open such connection for the generation of dial information. The aural intelligence signal outgoing from the telephone equipment STE is, accordingly, modulated at the modulator SM1 and consists of the 1.045-megacycle carrier plus symmetrical pairs of sidebands corresponding to the frequency components of the aural intelligence signal.

The outgoing and incoming composite intelligence signals of each of the substations S1–S30 are directed through a modulator OPM and a demodulator IPM, respectively, individual to each. The modulators OPM and demodulators IPM at each of the substations S1–S30 can be identical in construction. An analog or product multiplier can be employed for the modulators OPM and demodulators IPM so that the output signal of each is the instantaneous product of the two applied input signals void of unwanted harmonic frequencies. Such product multipliers may be of the type described in the F. Gray Patent 2,257,795 which issued on October 7, 1941 which discloses a single pass-band tube device incorporating a split anode feature which may be employed as a modulator or demodulator unit. Such product multipliers may also be Hall-effect multiplier devices now well-known in the art. The need for employing channel filtering with the modulators OPM and demodulators IPM is avoided. The modulators OPM are used to modulate a base-band signal comprising the composite intelligence signal from the associated one of the substations S1–S30 upon the application thereto of an appropriate channel carrier for transmission through one of the plurality of frequency divided communication channels in the coaxial cable 1. Appropriate channel carriers are selectively applied to the modulators OPM and demodulators IPM by the central office equipment through the agency of the control unit RCU, hereinafter to be described. This base-band signal comprises the visual intelligence signal and the aural intelligence signal modulated on the 1.045-megacycle carrier. Accordingly, the operation of the modulators OPM is comparable to the operation of a one-to-many switch. Similarly, the demodulators IPM operate to separate and demodulate the incoming composite intelligence signals to the line concentrating unit of FIG. 1 which appears as multichannel signals. Channel filtering is similarly avoided with respect to demodulators IPM. The operation of the demodulators IPM is such that if a carrier frequency exactly equal to the channel carrier frequency is provided as one input and the multichannel signal is provided as the second input, the output therefrom is the applied carrier and the sum and difference frequency components produced by the applied carrier and the frequency components of the multichannel signal. Accordingly, only the upper and lower sidebands of the composite intelligence signal included in the multichannel signal which has been modulated upon the channel carrier frequency identical to the applied demodulating channel carrier is directed to the associated one of the substations S1–S30 as it alone produces difference frequencies sufficiently low to be passed by the low-pass filter 27 associated therewith. The demodulators IPM, therefore, perform the function of a many-to-one switch.

As it is further described hereinafter, each of the substations S1–S30 is provided with a communication connection to the central office through its associated modulator OPM and demodulator IPM which effectively function as switching devices whenever activated by the application of a channel carrier signal thereto. Actually, each of the substations S1–S30 is in physical connection, as distinguished from communication connection, at all times with the central office equipment shown in FIGS. 2 and 3. During the non-application of a channel carrier signal, each of the modulators OPM and demodulators IPM serve as isolation or buffer stages between the central office and individual ones of the substations S1–S30 with which they are associated. The utilization of the modulators OPM and demodulators IPM to function as switching devices avoids the need for mechanical type switches normally employed to perform necessary switching operations. Accordingly, the stray capacitance inherent in mechanical type switches is eliminated from the illustrated embodiment shown in FIGS. 1, 2 and 3.

Each of the 30 modulators OPM associated with an individual one of the substations S1–S30 is connected to a mixing network 3. Mixing network 3 can be a resistive type network well known in the art and, accordingly, a detailed description need not be given. The operation of the mixing network 3 is such that the composite intelligence signals directed thereto from the activated ones of the modulators OPM are mixed and appear at the single output thereof as a multichannel signal, each signal being modulated upon a different channel carrier. The composite intelligence signals appearing at the output of the mixing network 3 are frequency separated. Accordingly, purity of the individual composite intelligence signals is maintained.

The multichannel signal from the output of mixing network 3 is directed to an output band-pass filter 5. The output band-pass filter 5 is tuned to pass frequencies between 2.5 and 32.5 megacycles corresponding to the combined allocated bandwith of the ten communication channels in the coaxial cable 1. Therefore, only composite intelligence signals modulated upon a channel carrier are passed by the output band-pass filter 5. A by-pass arrangement is provided for the output band-pass filter 5 which includes serially arranged scan channel filter 7, a detector circuit 9 and a scan channel filter 11. The scan channel filter 7 is a band-pass filter tuned to pass frequencies between 32.5 megacycles and 35.5 megacycles, i.e., signals modulated on the 34-megacycle scan frequency carrier hereinafter described. Scan channel filter 11 is also a band-pass filter and is tuned to pass a 1.045-megacycle tone, i.e., that frequency generated by the tone generator TG during an off-hook condition of one of the substations S1–S30. The operation of the by-pass arrangement is such that only a 1.045-megacycle tone which has been modulated upon a 34-megacycle carrier is passed to provide a detectable condition by the central office for the purpose of service request supervision of the served substations S1–S30 as is further described hereinafter. The signals transmitted through the by-pass arrangement comprising the scan channel filters 7 and 11 and the detector 9 and also the multichannel signals passed by the output band-pass filter 5 are directed to an output line amplifier 13. The signals applied to the output line amplifier 13 are amplified and directed through a coupling capacitor 15 to coaxial cable 1. A power supply L17 is locally connected to the coaxial cables 1 and 2 and those signals transmitted through the coupling capacitor 15 provide undulations of the constant potential supplied therefrom for transmitting the multichannel signals.

The portion of the line concentrating unit so far described is that portion necessary to provide service for outgoing calls from the group of substations S1–S30. Similarly, corresponding equipment is employed to provide service for incoming calls to the group of substations S1–S30. Multichannel signals are transmitted from the central office along coaxial cable 2 and applied to the input of line amplifier 19 through the coupling capacitor 21. A power supply C17 is connected at the central office to the coaxial cables 1 and 2. The processing of the composite intelligence signals at the central office is set forth in greater detail below. The entire multichannel signal is amplified by the input line amplifier 19 and directed to the input band-pass filter 23 which is tuned to pass signals of 2.5 megacycles to 32.5 megacycles; i.e., the combined allocated bandwidth of the ten communication channels in coaxial cable 2. The output of the input band-pass filter 23 is directed to a distribution network 25 which may comprise a resistive type network well known in the art. Each of the 30 demodulators IPM are connected to the outputs of the distribution network 25 which operates to disseminate the entire multichannel signal direct through the input band-pass filter 23 to the input of each of the demodulators IPM. Each of the demodulators IPM operates to provide a many-to-one switching function, as was mentioned above, and are individually associated with and connected to each of the substations S1–S30 through an associated low-pass filter 27. Those frequencies directed to each of the substations S1–S30 from the output of the associated demodulator IPM and through the low-pass filters 27 comprise the composite intelligence signal, the aural portion of which is modulated on the 1.045 megacycle subcarrier frequency generated at the calling substation by the tone generator TG. Only the composite intelligence signal included in the multichannel signal which has been modulated upon a channel carrier identical to that applied to the demodulator IPM produces signals in the base-band so as to be directed through the associated low-pass filter 27. It is evident that the composite intelligence signal directed through the low-pass filters correspond to the upper and lower sidebands of the modulated combined intelligence signal transmitted through the appropriate one of the communication channels of coaxial cable 2. A sound detector 28 is included as part of each of the substations S1–S30 and connected between the output of the associated low-pass filter 27 and the telephone equipment STE. The sound detector 28 is operative to separate and demodulate the aural portion of the composite intelligence signal received at each of the substations S1–S30.

Channel carrier frequencies are developed at both the line concentrating unit of FIG. 1 and the central office of FIGS. 2 and 3 by the harmonic generators L29 and C29, respectively. The channel carrier frequencies are harmonics of a base frequency of one megacycle which is developed by oscillator 29. The oscillator 29 can be a crystal-controlled type oscillator well known in the art. The output of the oscillator 29 is applied directly to the input of the harmonic generator C29 and to the harmonic generator L29 through the one megacycle tuned filter 30 and the base-band of the coaxial cable 2 and through the one megacycle tuned selective filter 31. As the output frequencies of each of the harmonic generators L29 and C29 are harmonics of a same base frequency, the channel carrier frequencies provided at the line concentrating unit and the central office are identical and the operation of the harmonic generators necessarily synchronized. The outputs of each of the harmonic generators L29 and C29 are directed to a group of selectively tuned filters L1–L10 and C1–C10, respectively, each filter in each of the groups of filters being tuned to pass one of the channel carrier frequencies. For example, filters L1 and C1 are tuned to pass a four-megacycle channel carrier frequency; filters L2 and C2 are tuned to pass a seven-megacycle carrier frequency and similarly for other corresponding filters in each group to filters L10 and C10 which are tuned to pass the highest channel carrier frequency of 31 megacycles. The output of harmonic generator L29 is also directed to filter L11 which is tuned to pass a scan frequency carrier of 34 megacycles.

A control by the central office over the line concentrating unit is effected through the control unit shown within the dotted enclosure RCU. The control unit RCU is responsive to a group of polytonic tones which are directed in parallel along the base-band of coaxial cable 2 from the central office. In the illustrated embodiments, seven polytonic tones in the frequency band of 400 kilocycles to 800 kilocycles are representative of a seven-bit binary word, the presence or absence of a corresponding tone being representative of a binary "1" or binary "0." The binary word is directed to the control unit RCU through the 450 kilocycle to 750 kilocycle band-pass filter 33 and consists of an order and address portion to direct the action of the control unit RCU. The order portion of the binary word may consist of the first two binary bits and indicates the particular operation to be performed with respect to either a particular one of the substations S1–S30 or a particular one of the ten communication channels represented by the remaining five binary bits. The operation and function of the control unit RCU is further described hereinafter with respect to FIG. 4.

The distribution of the various carrier frequencies and tone signals, hereinabove mentioned, along the frequency spectrum of coaxial cables 1 and 2 is illustrated in FIG. 5. As mentioned above, coaxial cables 1 and 2 are each divided into ten communication channels, each having a bandwidth of three megacycles and an associated channel carrier. For example, communication channel 1 extends from 2.5 megacycles to 5.5 megacycles and has associated therewith a channel carrier of 4 megacycles; communication channel 2 extends from 5.5 to 8.5 megacycles and has associated therewith a channel carrier of 7 megacycles; etc. In the first vertical column is shown the composite signals which are developed at particular ones of substations S1–S30 and directed to the modulators OPM associated therewith. The aural intelligence portion of the composite signal is shown as a modulated signal consisting of symmetrical pairs of sidebands about the 1.045-megacycle tone generated by the tone generator TG and employed as a subcarrier. As each of the composite signals from particular ones of the substations S1–S30 is modulated by modulator OPM associated therewith upon the application thereto of a particular channel carrier, the various signals are distributed along the frequency spectrum of coaxial cable 1 as further shown in FIG. 5. A similar distribution is effected, as is hereinafter described, at the central office for signals being directed to particular ones of substations S1–S30 along the frequency spectrum of coaxial cable 2. The 1.045-megacycle tone is shown both as an unmodulated signal and as symmetrical pairs of sidebands about the 34-megacycle scan frequency employed as a carrier during the scanning operation. This is the modulated signal which is directed to the by-pass arrangement including serially arranged scan channel filter 7, detector circuit 9 and scan channel filter 11. However, due to the operation of this by-pass arrangement, the unmodulated 1.045-megacycle tone only is directed along the coaxial cable 1, as shown. Also depicted are the polytonic tones generated at the central office and directed along the base-band of coaxial cable 2 to control the operation of the control unit RCU.

The equipment shown in FIGS. 2 and 3 as being contained in the central office is, for all practical purposes, of the type which is described in the above-identified patent application of W. A. Budlong et al. Indeed, the present invention may be used directly with the central office routing and control circuitry shown in FIGS. 2 through 11 of the Budlong et al. application, the only modifications required being the provision of broad-band signal paths for the composite audio and video signals herein contemplated rather than the narrow band audio signals contemplated by Budlong et al. All other modifications or additions are shown herein in detail. For convenience, and to avoid undue length in the present disclosure, the central office common control circuitry has been herein illustrated only with general functional blocks and the operation of these blocks described in functional terms. For a more detailed description of the specific operation of these blocks, reference may be made to the Budlong et al. application.

Referring then to FIG. 2, the central office circuits immediately connected to the frequency multiplexed coaxial transmission cables 1 and 2 will first be described. The multichannel signals transmitted through the coaxial cable 1 are directed to the input line amplifier 35 through a coupling capacitor 37. The multichannel signals are amplified by the input line amplifier 35 and the individual combined intelligence signals are thereupon separated according to communication channels by a group of channel filters CF1–CF10 and demodulated by detectors CD1–CD10 associated with each of the communication channels in coaxial cable 1, respectively. The output of each of the detectors CD1–CD10 consists of an unmodulated visual intelligence signal extending to 1.01 megacycles and an aural intelligence signal. The aural intelligence signal appears as symmetrical sidebands about a carrier frequency of 1.045 megacycles upon which it was initially modulated by the modulator SM1 at the substations S1–S30 prior to being directed to the modulators OPM. Accordingly, the outputs from each of the detectors CD1–CD10 are identical to the composite intelligence signal directed from that one of the substations S1–S30 along the communication channel in the coaxial cable 1 with which it became associated upon the application thereto of a corresponding channel carrier. The composite intelligence signal from each of the detectors CD1–CD10 is directed through the low-pass filters LP1–LP10, respectively, to the A (input) side of the distribution network 39. Accordingly, the composite intelligence signal directed to the input terminals of the A side of a distribution network 39 may be either directed through the distribution network 39 and from the central office in a conventional manner over communication media of sufficient bandwidth, i.e. two-way trunk 91, or again modulated for carrier transmission for intra- or interconcentrator communication.

The outputs of the detectors CD1–CD10 are also coupled to the subcarrier filters SCF1–SCF10, respectively, which area each tuned to pass the 1.045-megacycle subcarrier frequency and operative to direct a portion thereof to the detectors SCD1–SCD10, respectively. The output of each of the detectors SCD1–SCD10 is therefore the detected envelope of the 1.045-megacycle subcarrier frequency generated whenever a particular one of the substations S1–S30 is in an off-hook condition. Accordingly, the 1.045-megacycle subcarrier frequency is utilized to modulate the aural portion of the composite intelligence signal and, in addition, to provide a detectable condition at the central office whereby supervision of the state condition of the particular substations S1–S30 may be effected. The detectors SCD1–SCD10 are each connected to the line scanner 47 which operates under the control of the common control 41 to sample for the presence of such detectable condition at the outputs thereof for purposes of supervision, as hereinafter described.

The distribution network 39 is an end-marked transmission network of the type described in the above-identified W. A. Budlong et al. application. The distribution network 39 comprises a plurality of crosspoints which are selectively enabled to establish a transmission path between a predetermined A (input) terminal and a predetermined B (output) terminal. An equal number of A (input) and B (output) terminals are provided. Transmission networks of this general type are also disclosed, for example, in the E. Bruce et al. Patent 2,684,405 which issued on July 20, 1954 and the K. S. Dunlap application, Serial No. 672,651, filed on July 18, 1957. Appropriate order and addresses are directed from a common control unit 41 to the network control portion of the distribution network 39 wherein operations to implement these commands are effected to establish or disconnect a transmission path of at least 1.05 megacycle bandwidth between predetermined A (input) and B (output) terminals. Terminals are also provided at the distribution network 39 for the access of trunks to and from a distant central office and for supplying administrative tones, i.e., ready tone, busy tone, and ringing tone.

The common control unit 41 is of the type shown in the above-identified W. A. Budlong et al. application and operates as a flexible universal information processing center which serves to process on a time division basis all of the actions necessary for the provision of communication to and from the individual substations S1–S30. The common control unit 41 performs the logic function of the system, gathering information as to the condition of the various units of the system and directs orders and addresses to individual units to provide those operations necessary for the establishing of communication connections to and from particular ones of the substations S1–S30. Upon the determination of appropriate changes to be made in the system, enabling voltages are directed from the common control 41 to predetermined ones of the transmission gate circuits G1–G7 to provide a binary word in the form of parallel polytonic tones for the transmission of orders and addresses. The binary word is directed to the control unit RCU of the line concentrating unit of FIG. 1 along the base-band of coaxial cable 2 and through the band-pass filter 33. The control unit RCU serves to connect a predetermined channel carrier from one of the filters L1–L10 to the modulator OPM and the demodulator IPM of a particular one of the substations S1–S30 in a manner hereinafter described. The operation of the control unit RCU in conjunction with the common control unit 41 is such that if a composite intelligence signal appearing at one of the A (input) terminals of the distribution network 39 is to be directed to one of the substations S1–S30, the signal is directed to a particular one of the channel modulators CM1–CM10 from a selected one of the B (output) terminals 1B–10B, respectively, and modulated thereby on a channel carrier permanently allocated thereto. The channel carrier frequencies are normally applied to the channel modulators CM1–CM10 through the tuned filters C1–C10, respectively. Concurrently, the common control 41 directs the control unit RCU to connect a same channel carrier as applied to the particular one of the channel modulators CM1–CM10 to the modulator OPM and demodulator IPM of the particular one of substations S1–S30 for which the combined intelligence signal is intended. The output from the modulators CM1–CM10 is directed to the channel filters CF11–CF20, respectively, which are each tuned to pass the frequency band of one of the communication channels provided in coaxial cable 2. If the composite intelligence signal appearing at one of the A (input) terminals 1A–10A of the distribution network 39 is to be directed as an interconcentrator call, a transmission path is established therefor through the distribution network 39 from that one of the A (input) terminals on which the signal appears to a B (output) terminal and appropriate channel modulator, not shown, which are associated with a communication channel peculiar to an additional line concentrator unit, also not shown, providing service to the called substation. Similarly, the common control 41 directs a binary word in the form of polytonic tones to the control unit of the additional line concentrator unit to apply a same channel carrier to the called substation as employed to modulate the composite intelligence signal in the appropriate channel modulator. In the latter instance, the channel carrier signals applied to the calling and the called substations may be identical as the danger of generating "side-tones" effects is not present as in the case of an intraconcentrator call. If, however, the composite intelligence signal is to be directed on a noncarrier basis as an interexchange call, a transmission path is established therefor through the distribution network 39 from that one of the A (input) terminals on which the signal appears to the B (output) terminal TB1 which is connected by the conductor 95 and through the hybrid network HN to the two-way trunk 91.

A permanent storage unit 43 is provided to program the operation of the central office equipment and, indirectly, the line concentrating unit. The operation of the permanent storage unit is self-perpetuating and provides sequences of coded commands to the common control unit 41 to determine the necessary cyclic operation to be performed by the various units of the over-all system. Further, it directs those operations which the over-all system is required to perform under an existing group of circumstances. The permanent storage unit 43 can be of the type which is shown in the above-identified W. A. Budlong et al. application and fully described in the R. C. Davis et al. Patent 2,830,285, issued April 18, 1958. The permanent storage unit described in each of the above-identified W. A. Budlong et al. application and R. C. Davis et al. patent is of the type designated as a "flying spot store." The information required to program the operation of the central office equipment and, indirectly, the line concentrating unit is stored on a plurality of high resolution photographic plates, each plate having an array of definable storage areas set to represent binary quantities. A scanning of such storage areas directs a binary word to the common control unit 41 to direct appropriate orders and addresses to various units of the over-all system to perform necessary operations. A translation from directory number to line equipment is also provided by the permanent storage unit 43.

A temporary storage unit 45 is provided wherein a record is kept of the progress of a call through the system. The temporary storage unit 45 can be a barrier-grid type of storage system having a destructive read-out as is well known in the electronic art. A description of such unit may be found in the Bell System Technical Journal of November 1955 on pages 1241 through 1264. One major function of the temporary storage unit 45 is to record the call condition of each of the substations S1–S30 between successive scannings thereof. The recordation of the call condition of each of the substations S1–S30 is made in spots specifically assigned to each substation. A comparison of the information stored in the temporary storage unit 45 of a previous scanning operation with that of a next subsequent scanning operation with respect to a particular substation provides sufficient information to determine changes in the call condition thereof for initiating the necessary actions to be taken by the system. For example, if the information stored in the temporary storage unit 45 indicates that a particular one of the substations S1–S30 is in an on-hook condition and a subsequent scanning operation determines the particular substation to be in an off-hook condition, an indication that service is requested by the particular substation is made available to the common control unit 41. Further, dial pulses are initially stored in the temporary storage unit 45 as is information relating to idle communication channels and idle substations.

As disclosed in the afore-mentioned Budlong et al. application, the permanent store 43 may comprise a "flying spot store" in which permanent information such as subscriber directory number to equipment number translations and system overall programing is stored on photographic plates. This information is read out by a small intense light beam directed by address information from the common control 41.

Temporary store 45, on the other hand, may comprise a "barrier grid" storage tube in which less permanent information such as the current status of subscriber lines and concentrator channels is stored as charge permutations on a dielectric sheet in a cathode ray tube. This information is read onto and off of the dielectric target by means of an electron beam also directed by common control 41.

Common control 41 may comprise a high speed time-divided data processing circuit such as that disclosed in the afore-mentioned Budlong et al. application. Control circuit 41 comprises a large number of registers, scanners, selectors, translators and other logic elements to utilize the information from permanent store 43, temporary store 45, scanners 47 and 97, selector 99 and distribution network 39 to control the operation of these and other components of the system. For example, control circuit 41, in response to a permanent program in permanent store 43, generates the signals necessary to sequentially scan the subscriber substations for activity, to record this activity data in temporary store 45, to direct the establishment of information paths through distribution network 39 when required for subscriber service, and, in general, to monitor and control all of the other activities of the central office equipment.

Information is preferably coded in parallel binary form and the various functions of the common control 41 performed successively for the various subscribers and channels. The details of one such control circuit are disclosed in the Budlong et al. application and since they represent no more than a large accumulation of individually simple and well known circuit components, and form no part of the present invention, will not be described in detail here. Instead, the present description will be restricted to the overall function required, the means for implementing these functions being incorporated by reference from the Budlong et al. application.

A line scanner unit 47 is provided to periodically determined the state or condition of each of the substations S1–S30. Scanner 47 may be identical to the scanner 108 in FIG. 1 of the above-identified Budlong et al. application. That is, it may comprise a simple diode gating matrix which serves to connect lead 44 to that one of the outputs of detectors SCD and SCD1–SCD10 which is identified by control signals on lead 42. Scanner 47 therefore may comprise no more than a many-to-one code controlled steering circuit such as are well known in the art. The line scanner unit 47 in conjunction with the control unit RCU successively interrogate each of substations S1–S30 in turn approximately every one-tenth of a second according to addresses which are received from the common control unit 41. The line scanner unit 47 operates to detect the presence of the 1.045-megacycle tone generated by the tone generator TG during an off-hook condition at one of the substations S1–S30. As the 1.045-megacycle tone is employed as a subcarrier for the aural intelligence signal, this tone signal is present during that time in which a particular one of the substations S1–S30 is provided with service. The detectable condition sensed by the line scanner unit 47 during a service period to a particular one of the substations S1–S30 is the envelope of the 1.045-megacycle tone at the output of the detectors SCD1–SCD10, respectively. The serviced ones of the substations S1–S30 are sensed with respect to the communication channel which has been allocated thereto. During a period of non-service to a particular one of the substations S1–S30, the envelope of the 1.045-megacycle tone appearing at the output of the detector SCD is detected on a time basis by the scanner 47. If a particular one of the substations S1–S30 is indicated as idle in the temporary storage unit 45, a scan channel frequency carrier (34 megacycles) is initially applied by the control unit RCU to the modulator OPM and demodulator IPM associated therewith under the direction of the common control unit 41 in accordance with the "stored program" in the permanent storage 43. An output is derived from the detector SCD only during an off-hook condition of a particular one of the substations S1–S30 and an application thereto of the 34-megacycle scan channel frequency carrier due to the joint effect of the scan channel filter SCF (1.045 megacycles) and the by-pass arrangement comprising the scan channel filter 7 (32.5 megacycles to 35.5 megacycles), detector circuit 9 and the scan channel filter 11 (1.045 megacycles). As herein above described, the 34-megacycle scan channel frequency is suppressed by the by-pass arrangement, above detailed, and only the 1.045-megacycle tone, if present, is directed along the baseband of the coaxial cable 1 to the scan channel filter SCF during an interrogation of each of the substations S1–S30. Accordingly, the absence of a detectable condition at the output of the appropriate one of detectors SCD1–SCD10 or the detector SCD indicates an on-hook condition while the presence of a detectable condition thereat indicates an off-hook condition. A comparison of successive sensings of the presence of a detectable condition with respect to a particular one of the substations S1–S30 indicates to the common control unit 41 either a change or a no-change in the state condition of a particular one of the substations S1–S30.

Upon the detection of a change from an on-hook condition to an off-hook state condition (service request) at the output of detector SCD during a service determining operation directed with respect to a particular one of the substations S1–S30, a channel carrier is determined idle and applied to the modulator OPM and demodulator IPM of the calling substation through the agency of the control unit RCU by the common control unit 41. Accordingly, a two-way communication connection is established between the calling substation and the central office. For example, if the 4-megacycle channel carrier is determined as idle, such carrier is applied to the modulator OPM and demodulator IPM of the calling substation through the control unit RCU and a composite intelligence signal generated thereat appears at the output of the low-pass filter LP1 and the input terminal 1A of the distribution network 39. A return communication connection to the calling substation is simultaneously provided through the channel modulator CM1 which is normally connected to the output terminal 1B and is continuously supplied with a 4-megacycle channel carrier signal through the tuned filter C1. This return communication connection to the calling substation is from the output terminal 1B and the channel modulator CM1 associated therewith through the channel filter CF11 and output line amplifier 49 along the coaxial cable 2 to the modulator IPM associated with the calling substation to which has been applied the 4-megacycle channel carrier. Upon the 4-megacycle channel carrier having been applied to the modulator OPM and demodulator IPM associated with the calling substation, a transmission path is established through the distribution network 39 between the terminal RT connected to the ready tone source 85 and the output terminal 1B to provide an indication to the calling substation that the central office is prepared to receive dial information. The 1.045-megacycle tone continuously generated at the requesting one of the substations during an off-hook condition thereof is now modulated upon the applied 4-megacycle channel carrier and directed along the communication channel in coaxial cable 1; detected by the detector CD1; passed through channel filter CF1 and sound carrier filter SCF1; and the envelope thereof is provided at the output of detector SCD1. As a dialing operation by the dial device D is interruptive of the 1.045-megacycle tone to the modulator SM1, dial pulses are detected by sensing the consecutive presence and absence of the envelope of the 1.045 megacycle tone in the communication channel as previously allocated to the particular one of the substations S1–S30 by the common control unit 41. The common control unit 41, accordingly, directs, by the way of control lead 42, the scanning unit 47 to sense that one of the detectors SCD1–SCD10 corresponding to the carrier channel allocated to the requesting one of the substations S1–S30 at a higher scanning rate, approximately once every five milliseconds. The dial pulse thus received is stored in the temporary storage unit 45. Upon completion of the dialing operation, the equipment number of a called substation is obtained by the common control unit 41 from the permanent storage unit 43.

If the call is originated at one of the substations S1–S30 as an interexchange call, the distribution network 39 under the direction of the common control unit 41 provides a transmission path by establishing a connection from that one of the A (input) terminals and that one of the B (output) terminals corresponding to the communication channel in coaxial cables 1 and 2 allocated to that substation for the transmission of the call and the terminals TB1 and TA1, respectively, which are connected to the two-way trunk 91 through the hybrid network HN. A similar connection is also made under the direction of the common control unit 41 if a call is originated at a distant central office and intended for one of the substations S1–S30. The latter communication connection is established by the application to the modulator OPM and demodulator IPM of the called one of the substations S1–S30 of an idle channel carrier corresponding to the communication channel associated with the connected A (input) and B (output) terminals. The two-way trunk 91 provides a bandwidth of at least 1.05 megacycles for communication to a distant central office.

However, if the call is originated at one of the substations S1–S30 as an intra-concentrator call, transmission paths are provided between the A (input) terminals corresponding to the channel carriers allocated to each of the calling and the called substations and the B (output) terminals corresponding to the channel carrier allocated to the other substation in coaxial cables 1 and 2. A two-way communication connection is provided upon the application of appropriate channel carriers to the modulators OPM and demodulators IPM of the calling and called substations and the provision of the above-defined paths through the distribution network 39. The composite intelligence signals which appear at each of the A (input) terminals and B (output) terminals of the distribution network 39 are identical to the signals generated at each of the calling and called substations, respectively. Regardless of the origin of the call, the composite intelligence signal to be directed from the B (output) terminal intra-concentrator to one of the substations S1–S30 from the central office is modulated by the appropriate one of the channel modulators CM1–CM10 upon a channel carrier identical to that applied to the modulator OPM and demodulator IPM thereat and supplied from one of the tuned filters C1–C10. The channel carrier frequencies directed through the filters C1–C10 are identical to the channel carrier frequencies which are selectively applied from the filters C1–C10, respectively, through the control unit RCU under the direction of the common control unit 41 to the substations S1–S30. The common control unit 41, upon providing for one of the above-described transmission paths through the distribution network 39, sequentially directs a pair of binary words composed of parallel polytonic tones to the control unit RCU, one binary word identifying a particular channel carrier to be applied to the modulator OPM and demodulator IPM of the called one of the substations S1–S30 identified by the second binary word and corresponding to the communication channel allocated to such substation, as is further hereinafter described.

*Channel Assignment and Channel Switching*

As described above, the state condition of each of the substations S1–S30 is determined upon a sensing of the output of detector SCD or the detectors SCD1–SCD10 by the line scanner unit 47 as addressed by the common control 41. The prior state condition of each of the substations S1–S30 as determined by the next prior operation of the line scanner unit 47 with respect thereto is stored in the temporary storage unit 45. The information sensed by the line scanner unit 47 during the most recent operation is directed to the common control unit 41 whereat it is compared with that information previously stored in the temporary storage unit 45. This comparison of the information secured by the most recent operation of the line scanner unit 47 and that stored in the temporary storage unit 45 and a non-identity thereof indicates to the common control unit 41 a change in the state condition of the particular one of the substations S1–S30 being scanned. Upon the determination of a change in the state condition of any one of the substations S1–S30, the permanent storage unit 43 programs the common control unit 41 to affect those switching operations necessary to meet the present call condition of that subscriber. The prior call condition of the scanned one of the substations S1–S30 is erased and the present call condition thereof stored in the temporary storage unit 45.

The operation of the various elements which have been described above can be best understood if the manner to which service is provided to one of the substations S1–S30 is described in detail. Considering for the moment substation S1 has recently been placed in an off-hook condition and that the tone generator individual thereto has commenced to generate the 1.045-megacycle tone indicative thereof. The permanent storage unit 43 programs the common control unit 41 to apply the scan frequency of 34 megacycles successively and recurrently to the modulators OPM and demodulators IPM associated with each of the substations S1–S30 in turn. The 1.045-megacycle tone is modulated upon the scan frequency of 34 megacycles when applied to the substation S1 and directed through the by-pass arrangement of the scan channel filters 7 and 11 and the detector 9; only the 1.045-megacycle tone being directed to the output line amplifier 13 and along coaxial cable 1. The 1.045-megacycle tone is thereupon directed through the scan channel filter SCF to detector SCD which provides the envelope thereof which is sensed by the line scanner unit 47. The absence of the envelope of the 1.045-megacycle tone during a scanning of a particular one of the substations S1–S30 is indicative of an on-hook condition therefor. As the line scanner unit 47 and the control unit RCU have a recurring operation programmed by the common control unit 41, successive scans thereby of substation S1 provide for the detection of a change from the non-presence to the presence of the 1.045-megacycle tone to indicate a service request condition. Conversely, and as hereinafter described, a change in the call condition from the presence to the non-presence of the envelope of the 1.045-megacycle tone which is detected at the output of the detectors SCD1–SCD10 corresponding to the communication channel allocated to one of substations S1–S30, indicates that service is no longer requested by the substation.

Referring to FIG. 6, a time chart of the scanning operation is shown. The chart on FIG. 6 is divided into horizontal intervals of one-tenth of a second duration to represent successive scannings of substation S1 which are designated T1–T8. At the time T2, the call condition of the substation S1 is not changed since the prior scanning thereof at time T1 and, upon the application of the scan channel frequency of 34 megacycles to the modulator OPM and demodulator IPM of substation S1, the envelope of the 1.045-megacycle tone is absent at the output of detector SCD. However, between the times T2 and T3, the subscriber S1 has removed his receiver and the tone generator TG operates to provide the 1.045-megacycle tone indicative thereof. At the time T3, the scan frequency of 34 megacycles is applied to the modulator OPM and demodulator IPM associated with substation S1 as shown by the shaded portion of the chart and the 1.045-megacycle tone is directed along the base-band of coaxial cable 1 to the detector SCD. The envelope of the 1.045-megacycle tone at the output of detector SCD is thereupon detected by the line scanner unit 47 and an indication thereof is directed to the common control unit 41. The common control unit 41 in conjunction with the temporary storage unit 45 determines that the call condition of the substation S1 has changed since the previous scan at time T2. The prior state condition of substation S1 is thereupon erased and the present state condition thereof stored in the temporary storage unit 45. Accordingly, signals are thereupon directed from the common control unit 41 as programmed by the permanent storage unit 43 to search through the temporary storage unit 45 for an idle communication channel and to the pulse forming network PF in the form of a binary word indicative of the appropriate switching actions to be taken by the system.

The pulse forming network PF comprises a tone generator TG1 which is continuously operative to generate frequencies contained within a 450-kilocycle to 750-kilocycle band. The multifrequency output of the tone generator TG1 is directed to the group of tuned filters F1–F7 to provide a separation thereof according to distinct frequency tones. The outputs of the tuned filters F1–F7 are directed to one input of the transmission gates G1–G7, respectively. Directed to the other input of the transmission gates G1–G7 is the binary word generated by the common control unit 41. The positions of the constituent digits of the binary word generated by the common control unit 41 therefor enables certain ones of the transmission gates G1–G7 to transmit that individual frequency passed by its associated tuned filter F1–F7, respectively, to the output line amplifier 49 and capacitor 51 along the base-band of coaxial cable 2. Therefore, the presence or absence of a particular frequency in the base-band of the coaxial cable 2 is indicative of the presence or absence, respectively, of a digit or bit in the binary word directed by the common control unit 41 to the transmission gates G1–G7 of the pulse forming network PF.

These frequencies or polytonic tones from the pulse forming network PF are directed through the capacitor 21, amplified by the input line amplifier 19 and passed by the band-pass filter 33 (450 kilocycles to 750 kilocycles). The band-pass filter 33 is connected to the receiver circuit 51 which comprises a group of frequency sensitive detectors FSD1–FSD7 which correspond in frequency sensitivity to the tuned filters F1–F7 of the pulse forming network PF, respectively. Accordingly, selected ones of the frequency sensitive detectors FSD1–FSD7 operate to provide a direct-current indication of those polytonic tones passed through enabled ones of the transmission gates G1–G7, respectively, to the short term memory 53. The short term memory 53 may advantageously comprise a plurality of monostable multivibrator devices normally arranged to provide an output pulse only upon the application thereto of the direct-current indication of received polytonic tones from the frequency sensitive detectors FSD1–FSD7. As mentioned above, the binary word so transmitted consists of an order portion comprising two binary bits to indicate that action which is to be taken, i.e., scan, mark or disconnect, on the line or channel indicated by the remaining five binary bits thereof. Accordingly, the short term memory 53 may include an order store group comprising two multivibrator devices responsive one to each of the two binary bits corresponding to the order portion of the binary word; the order store group controls the short term memory 53 to distinguish and store that information contained in the remaining binary bits identifying the particular one of the substations S1–S30 or the particular channel to be affected in addition to identifying the particular action to be taken by the channel carrier selector switch CS. Also contained in the short term memory 53 are a line store group comprising five multi-vibrator devices and a channel store group comprising four multivibrator devices and each selectively responsive to the order store group to store line identity and channel identity, respectively. As a short term memory 53 described is of a conventional design, a more detailed description thereof is not deemed necessary. However, it should be understood that a line store group and a channel store group should be contained in the short term memory 53 as the channel carrier selector switch CS, hereinafter to be described, is operated through the agency of the translator 55 on a coincidence of such information stored in each group to apply a selected channel carrier or the 34-megacycle scan frequency to each of the substations S1–S30. However, the selector switch CS does not require a coincidence of such information to effect a disconnect of a particular channel carrier from the substations S1–S30.

The translator 55 may be of the diode-resistor type commonly known in the art and which is adapted to provide for an 11-to-51 translation. The outputs from the translator 55 are divided into four groups; mark line group, mark channel group, disconnect channel group, and scan group. Each of the mark channel and disconnect channel groups include ten leads, each corresponding to the ten channel carrier inputs directed from the filters L1–L10. The mark line group includes 30 leads each corresponding to individual ones of the substations S1–S30. Only one lead is contained in the scan mark group which corresponds to the filter L11 connected to the harmonic generator L29. The translator 55 directs pulses of proper polarity, hereinafter described, along particular leads in selected ones of the four above-mentioned groups as controlled by the short term memory 53.

The channel carrier selector switch CS represented in FIG. 1 in block representation is shown in detail in FIG. 4, the same numerals being used to indicate identical structure at the various crosspoints therein. Reference will be particularly made to the operation of selector switch CS necessary to supply substation S1 with channel carrier and scan frequency signals. An understanding of such operation with respect to substations S1 will make evident the manner by which service can be provided to each of the other substations S2–S30.

The selector switch CS is essentially a 30 x 11 matrix array of shunt diode AND type transmission gates controlled by the output signals developed by translator 55. The selector switch CS comprises 30 vertical busses V1–V30 and 11 horizontal busses H1–H10 and N1. The vertical busses V1–V30 correspond to the substations S1–S30, respectively. The horizontal busses H1–H10 and N1 correspond to the carrier signals passed by the group filters L1–L10 and the scan channel frequency passed by filter L11, respectively. If more than 30 substations are to be served, an additional vertical bus for each should be added. Similarly, if more than ten carrier channels are to be provided in coaxial cables 1 and 2, an additional horizontal bus for each should be added. An AND gate comprising a semiconductor diode 61 and resistors 63 and 65 is arranged at the crosspoints of each of the vertical busses V1–V30 with the horizontal busses H1–H10 and N1. The anode of the diode 61 is connected through the resistor 63 to the horizontal bus H1 and through resistor 65 to the vertical bus V1 and the cathode thereof is connected to ground. The diode 61 is normally maintained in a forward biased or conducting condition due to the application of a positive potential from the source V1 connected to the anode thereof through the resistor 68 and diode 67, bus ML1 and the serially arranged resistors 69 and 71. The bus ML1 is included in the mark line group outputs ML1–ML30 of translator 55 associated with the vertical busses V1–V30, respectively, and is responsive to the information stored in the line store group of the short term memory 53 through the translator 55. Accordingly, the junction of the resistors 63 and 65 is normally maintained at a ground potential but for a slight voltage drop developed across the normally forward biased diode 61. A gas filled diode tube 73 is arranged as a control element for determining the bias condition of the diode 61. The anode of tube 73 is connected to the junction of the resistors 67 and 71 while the cathode thereof is serially arranged with the diode 75 of corresponding polarity and the emitter-collector circuit of transistor 77 to the negative voltage source V2. The tube 73 is normally adapted to be nonconducting so that the voltage V1 applied to the diode 61 is sufficient to maintain the diode in a forward bias condition. Accordingly, the channel carrier frequencies directed along the horizontal busses H1–H10 do not appear on any vertical busses V1–V30 when the associated tube 73 is nonconducting due to the shunting effect of each of the diodes 61. This condition continues until such time as tube 73 begins to conduct and a reverse biasing voltage is applied to the diode 61.

Upon a service request condition from substation S1 being detected at the output of detector SCD, the common control 41 in conjunction with temporary storage 45 determines that a channel carrier frequency, for example four megacycles, is available ind sequentially directs two binary words comprising selected polytonic tones to the control unit RCU. Accordingly, the translator 55 directs a negative-going pulse along the mark channel group bus M1 through the capacitor 79 to the cathode of tube 73. The mark channel group contains ten busses M1–M10 each of which is associated with one of the ten horizontal busses H1–H10, respectively, and, accordingly, correspond to the individual carrier channels. In a similar manner, a positive-going signal is simultaneously directed from the translator 55 along the mark line bus ML1 through the capacitor 81 and resistor 69 to the anode of tube 73. The mark line group contains thirty busses each of which is associated with one of the thirty vertical busses V1–V30, respectively, and accordingly, correspond to the substations S1–S30, respectively. As these signals are of opposite polarity, the effects thereof are additive so as to supply sufficient breakdown potential to the tube 73.

Conduction in tube 73 results in a rise in potential at the anode of diode 61 and conduction in the diode 75 and transistor 77. The voltages V1 and V2 and the magnitude of resistor 69 are selected such that the junction of the resistors 69 and 71 approaches a negative potential when tube 73 begins to conduct. A cessation of the positive and negative-going pulses appearing on the mark line bus ML1 and the mark channel bus M1, respectively, does not cause the tube 73 to extinguish. The relative magnitudes of voltage sources V1 through the resistor 68 and V2 through the normally forward biased transistor 77 are such that conduction is maintained through the tube 73 and transistor 77 once conduction therein has been initiated. When the potential at the junction of resistors 69 and 71 becomes negative with respect to ground, diode 61 ceases to conduct and presents a high impedance to the four-megacycle channel carrier appearing on the horizontal bus H1. Accordingly, the four-megacycle channel carrier is directed through the resistors 63 and 65 and across the back impedance of diode 61 to the vertical bus V1. The vertical busses V1–V30 are connected to the inputs of the modulators OPM and demodulators IPM associated with each of the substations S1–S30, respectively. Accordingly, the four-megacycle channel carrier is maintained at the input of the modulator OPM and demodulator IPM of substation S1 so long as the tube 73 and the transistor 77 associated with crosspoint remain conductive.

To disconnect the four-megacycle channel carrier from the modulator OPM and demodulator IPM of substation S1, a positive pulse is directed along lead J1 of the disconnect channel group output of the translator 55 to the base electrode of the transistor 77 connected to the bus M1. This disconnect pulse is generated in response to a binary word comprising selected polytonic tones, the first two digits of which are indicative of a disconnect operation and four of the remaining five bits providing storage information to the short term memory 53 to identify the channel carrier to be disconnected. The disconnect pulse is of sufficient magnitude so as to reverse bias the transistor 77. The voltage at the cathode of tube 73 becomes more positive due to the increased drop across the emitter-collector circuit of transistor 77 so that conduction in tube 73 cannot be maintained. Diode 61 thereupon becomes forward biased to again provide a shunt path for the four-megacycle carrier.

A similar operation, but for slight modification, is performed to apply the scan frequency of 34 megacycles in turn to the modulators OPM and demodulators IPM associated with each of the substations S1–S30. For a scanning operation, a scan frequency is normally applied along a horizontal bus N1 connected to the output of the filter L11 to the AND type transmission gates comprising diode 61 and resistors 63 and 65, described above, at the scan crosspoints connecting the bus N1 and the vertical busses V1–V30. The scanning operation of the selector switch CS is, however, controlled jointly by the mark line group and the scan mark group busses from the translator 55. In order for the scan frequency to be applied to one of the substations S1–S30, a coincidence of pulses appear on the single scan mark bus SM and an appropriate one of the mark line group busses ML1–ML30 corresponding to the particular one of the substations S1–S30 to be scanned and generated by the translator 55 in response to two binary words received by the control unit RCU. To provide for a successive scanning of each of the substations S1–S30, pulses are directed by the translator 55 to the scan mark bus SM in response to the first of such binary words each one-three-hundredths of a second and to each of the mark line group busses ML1–ML30 in response to the second of such binary words in turn at the same rate so that this coincidence of pulses occurs to supply the scan frequency to each of the substations S1–S30 each one-tenth of a second. It is, of course, evident that the common control unit 41 may only direct binary words for solely applying the scan frequency to those of substations S1–S30 indicated as idle in the temporary storage unit 45.

It is to be noted that the scan frequency is directed to each of the individual substations S1–S30 on the vertical busses V1–V30, respectively, as are the various channel carrier frequencies. However, the operation of the selector switch CS is illustrated such as to provide for the programmed scanning operation without interfering with a call in progress. If, for example, a channel carrier frequency, i.e., four megacycles, is being supplied to a particular one of the substations S1–S30, e.g., substation S1, the voltage through the resistor 68 on bus ML1 at the junction of the cathode of diode 67 and the resistor 69 is at a less positive potential than normal due to conduction of the tube 73 at the crosspoint of horizontal bus H1 and vertical bus V1. Accordingly, the coincidence of a positive pulse directed through the capacitor 81 along the bus ML1 and a negative scanning pulse appearing on bus SM through capacitor 79 is not sufficient when applied to the anode and cathode, respectively, of the tube 73 at the scan crosspoint to effect a breakdown thereof by overcoming the less positive potential on bus ML1. Only one tube 73 of the plurality of tubes associated with each of the vertical busses V1–V30 can be made conductive at one time.

Due to the provision of the delay timer DT, it is not necessary for the translator 55 to supply a disconnect pulse for the scanning operation of the selector switch CS. The delay timer DT which is connected in parallel through a capacitor to the collector-base circuit of transistor 77 is periodically primed upon the conduction of any one of the gas tubes 73 associated with the scan mark bus SM. After that period of time necessary for one of the substations S1–S30 to be scanned, e.g., ten milliseconds, the delay timer DT operates to direct a positive pulse through the capacitor sufficient to reverse bias the emitter-base circuit of the associated transistor 77. The delay timer DT may consist of one of many known types of delay networks known in the art to provide an output pulse delayed with respect to the input pulse.

Administrative tones are supplied to the calling subscriber S1 through the distribution network 39 as controlled by the common control 41 to indicate the availability of a communication connection and the line condition of the called substation. The administrative tones include a ready tone supplied by source 85 to indicate that a communication channel is available and that the calling substation S1 may commence a dialing operation; a busy tone supplied by source 87 to indicate that the called substation is not available; and a ringing tone supplied by source 89 to indicate that the called substation is being rung. Each tone is transmitted to a particular one of the substations S1–S30 as a modulated signal upon a same channel carrier previously allocated to the particular substation. These administrative tones are modulated by an appropriate one of the modulators CM1–CM10 and directed through the coaxial cable 2 as a modulated signal to the particular one of the substations S1–S30 whereat they are selectively employed to indicate the various conditions. For example, the ready tone supplied by source 85 is directed to substation S1, which has been previously supplied with a four-megacycle channel carrier to the modulator OPM and demodulator IPM associated therewith, through a transmission path established in the distribution network 39 from terminal RT to terminal 1B connected to the modulator CM1. The modulator CM1 is normally supplied with a four-megacycle channel carrier through the filter C1. The absence of a ready tone upon the calling substation entering into an off-hook condition can indicate that a communication channel is not available. The ready tone is demodulated by the demodulator IPM at the substation S1 and appears as a steady tone thereat. Similarly, the busy tone supplied by source 87 can be applied in the same manner to substation S1 by the provision of a transmission path through the distribution network 39 connecting the terminals BT and 1B.

However, in applying the ringing tone to the line connections subsequent to the completion of a dialing operation and the application of an idle channel carrier to the modulator OPM and demodulator IPM of the identified called substation in a manner as outlined above, transmission paths are provided through the distribution network 39 so as to place the ringing tone source 89 in series connection to the B (output) terminals corresponding to the carrier channels previously allocated to the calling and the called ones of substations S1–S30. For example, if the ringing tone is to be applied to the calling substation S1 and the called substation S30 to which have been allocated four-megacycle and seven-megacycle channel carriers, respectively, a connection is established between the terminal 1B to the terminal RCB and between the terminal 2B to the terminal RCA. Accordingly, the ringing tone can be supplied to both the calling substation S1 and the called substation S30 simultaneously upon respective channel carriers. A similar connection can be made between the terminals TB1 and RCB and terminals RCA and 1B if a call is directed on a non-carrier basis along the two-way trunk 91. The ringing tone is directed through the coaxial cable 2 and the band-pass filter 23 so as to be applied directly to the demodulators IPM associated with the individual substations S1–S30. It should be noted that these administrative tones are modulated upon a channel carrier and received by only those of substations S1–S30 to which a same channel carrier is supplied by the selector switch CS in the manner described above with respect to the reception of the composite intelligence signal.

Upon the four-megacycle channel carrier being applied to the substation S1, the common control 41 directs appropriate order and address signals to the distribution network 39 to provide a transmission path between terminals RT and 1B thereof so that the ready tone from source 85 can be directed as a modulated signal to the substation S1. The presence of a ready tone at the output of the demodulator IPM associated with substation S1 indicates at the substation that the central office equipment is in condition to receive dial pulses.

Concurrently, the common control 41 as programmed by the permanent storage 43 directs the scanner 47 to individually scan the output of the detector CD1 associated with the carrier channel allotted to substation S1 every five milliseconds while continuing a normal scanning for the remaining substations S2–S30 at the output of detector SCD. At this time, the 1.045-megacycle tone is modulated upon the four-megacycle carrier which has been applied to the modulator OPM and demodulator IPM of substation S1 through the selector switch CS as directed by the common control 41. For the transmission of each dial pulse from the substation S1, the 1.045-megacycle tone generated by the tone generator TG and directed to the modulator OPM is interrupted by the dialing device D so that the envelope of the 1.045-megacycle tone is absent at the output of detector CD1 for intervals of approximately 20 milliseconds. As the rate of scan of the scanner 47 is of shorter duration than the dial pulses, the scanner 47 is able to detect each transition from the presence to the non-presence and from the non-presence to the presence of the envelope of the 1.045-megacycle tone to indicate the initiation and termination, respectively, of each transmitted dial pulse. Upon the initiation of the dialing operation, the common control 41 directs the distribution network 39 to disconnect the transmission path established between terminals RT and 1B for supplying the ready tone from source 85 to substation S1. The dialing pulses received from substation S1 are received by the common control 41 and stored in the temporary storage 43. Upon the storage of the completed dial code, information stored in the permanent storage 43 determines whether the call is to be directed as intraconcentrator, interconcentrator, or interexchange call. In the case of an intraconcentrator call, the common control 41 in conjunction with the permanent storage 43 determines the equipment number of the called substation S30. The common control 41 in conjunction with the temporary storage 45 then determines the call condition of the called substation, i.e., substation S30, based on the information stored therein as the result of a previous scanning operation. The common control 41 thereupon controls the distribution network 39 to establish the necessary transmission paths therethrough to indicate this condition to the calling substation S1. If the stored information indicates the substation S30 is busy and cannot receive the call, the network establishes a transmission path between terminals BT and 1B so that the busy tone from source 87 is directed to and modulated by modulator CM1 upon a four-megacycle channel carrier for transmission to substation S1. If the stored information indicates that the substation S30 can receive the call, two binary words indicating the identity of the called substation S30 and also the seven-megacycle channel carrier, respectively, determined as being idle are directed from the common control 41 to the pulse forming network PF. The pulse forming network PF provides those polytonic tones in the manner described above to the control network RCU. Accordingly, the translator 55 operates to apply an appropriate pulse to the mark channel bus M2, not shown, corresponding to the seven-megacycle channel carrier and also to the mask line group bus ML30 corresponding to the called substation S30. The application of the positive pulse to the mark line group bus ML30 associated with the called subscriber S30 simultaneously with the application of a negative pulse to the bus M2 results in tube 73 at this crosspoint becoming conductive to reverse bias semiconductor diode 61 thereat. The seven-megacycle channel carrier along bus H2, not shown, is applied to the modulator OPM and demodulator IPM associated with substation S30. Accordingly, a two-way communication path is established between the central office of the distribution network 39 and the calling substation S1 and called substation S30 by the application of different channel carriers to the modulators OPM and demodulators IPM associated with each of the latter on a four-wire transmission basis, i.e., respective carrier channels in coaxial cables 1 and 2 corresponding to the four-megacycle and seven-megacycle channel carriers are utilized for incoming and outgoing intelligence to each substation, respectively. A two-way communication connection to a substation being served by a second line concentrator unit, not shown, may be effected in a similar manner. The common control 41 thereupon directs to the distribution network 39 appropriate order and address signals to establish a connection between the terminals 1B and RCB and terminals RCA and 2B to connect the ringing current source to the substations S1 and S30. The ringing currents are received by demodulators IPM associated with each of the calling substation S1 and called substation S30 and selectively employed to give a ringing indication that the called substation is being rung and a call is being directed thereto, respectively. Similarly, if the call is to be interconcentrator, a transmission path is established through the distribution network 39 to connect the RCA terminal to a B (output) terminal associated with the additional line concentrator unit providing service to the called substation and corresponding to an idle communication channel therein which has previously been allocated to the called substation. However, if the call is to be directed interexchange, the common control unit 41 directs appropriate order and address signals to the distribution network 39 to connect the terminals RCA and TB1 for the transmission of ringing tones along the two-way trunk 91.

Two-way communication is provided between the central office and an operator or distant central office through the two-way trunk 91 which affords sufficient bandwidth for the transmission of a composite intelligence signal. While only one trunk 91 is shown, it is to be understood that a plurality of such trunks may be provided in the manner now to be described. The trunk 91 is connected to the A (input) terminal TA1 and B (output) terminal TB1 of the distribution network 39 by the leads 93 and 95, respectively, through a hybrid network connection HN. Accordingly, the communication connection to the substation S1 which can be equated to a four-wire transmission on the leads 93 and 95 is converted to a two-wire transmission by the hybrid network HN in a manner well known in the art.

The common control 41, upon having established the necessary transmission paths through the distribution network 39 to provide necessary ringing tones, now proceeds to determine an answer or off-hook condition of the called substation. With respect to an intraconcentrator call, this is effectively accomplished by sensing for the initial appearance of the envelope of the 1.045-megacycle tone which appears at the output of that one of the detectors CD11–CD20 corresponding to the communication channel allocated thereto upon the called substation entering into an off-hook condition. The common control 41 accordingly directs the line scanner unit 41 to sample for the appearance of the direct-current component of the 1.045-megacycle tone, at the output of the detector C12 to determine the off-hook condition of the called substation S30 to which has been applied the seven-megacycle channel carrier. A similar operation is provided for corresponding equipments associated with the additional line concentrating unit if the call is to be interconcentrated. The manner by which an answer or off-hook condition is determined with a substation served through the two-way trunk 91 is hereinafter described. However, upon the determination of an answer or off-hook condition of the called substation, the transmission path previously established through the distribution network 39 to a reply ringing tone to the B (output) terminals are disconnected by the common control 41 and transmission paths are re-established between the A (input) terminals corresponding to each of the calling and called substations and the B (output) terminals corresponding to the called and calling substations, respectively. For example, if the call is intraconcentrated, transmission paths are established between the terminals 1A and 2A and the terminals 2B and 1B, respectively, whereby a two-way communication connection is established between substations S1 and S30 to which have been applied the four-megacycle and seven-megacycle channel carriers, respectively. If the call is interconcentrated, corresponding transmission paths are established between the terminals 1A and 1B and the B (output) terminals and the A (input) terminals, respectively, which are associated with the additional line concentrator unit and correspond to the communication channel allocated to the called substation. Moreover, if the call is to be directed on a non-carrier basis, transmission paths are established between the terminals 1A and 1B and the terminals TB1 and TA1, respectively.

The availability and call condition of the trunk 91 is determined by the trunk scanner 97 which is of the type shown in the above-identified W. A. Budlong et al. application. The availability of one of the trunks 91 is determined by the sensing of a potential at a scanning point in the trunk 91 by the trunk scanner 97 which is indicative of the called condition thereof. The common control 41 addresses the trunk scanner 97 to interrogate recurrently the call condition of the trunk 91. A plurality of trunks such as trunk 91 are each scanned in turn and the result thereof is stored in the temporary storage 45. To establish an interexchange call, a trunk 91 is determined idle, by the common control 41 in conjunction with the temporary storage 45 as a result of a scanning thereof and directs distribution network 39 to provide a connection of the terminal 1A to terminal TB1 and terminal 1B to terminal TA1. Accordingly, a two-way communication connection is established between the substation S1 and the trunk 91.

Input signals indicating the trunk equipment numbers are received by the common control 41 from the permanent storage 43 to determine the proper connection of terminals where there is more than a single two-way trunk employed. The supervisory states to be assumed for signal transmission by the chosen available trunk 91 are directed from the common control 41 to a trunk signal selector 99 which is also shown in the above-identified W. A. Budlong et al. application. The trunk signal selector 99 is connected to the trunk 91 by one of the N pairs of conductors in the conductor group 101 wherein each pair of conductors is associated with one trunk 91. Signaling to a distant central office over an available trunk 91 is accomplished by selectively energizing or outpulsing along a pair of conductors in the conductor group 101 associated with the available trunk. For example, the energization of either of the pair of conductors transmits either an on-hook or off-hook condition to the distant central office on a loop basis indicative of further connections to be made thereat. In this manner, either stored dial pulses or the equipment number of the further connections can be directed from the common control 41 to the distant central office.

Similarly, calls directed to one of the substations S1–S30 from an operator or distant central office can be processed in a similar manner. Supervisory signals which may be transmitted on an E and M basis are detected from the distant office by the line scanner 97 at the scanning point located in the trunk 91. The supervisory signals so detected are directed to the common control 41 and, as described above, temporarily stored in the temporary storage 45 until the dialing thereof is completed to identify the called substation, for example substation S30. A determination is made by the common control 41 of the call condition of substation S30 from the scanning information contained in the temporary storage 45 and also of an available idle communication channel, for example that channel associated with the channel carrier of seven megacycles. The common control 41 directs the distribution network 39 to establish a connection from terminal TA1 connected to leads 93 and TB1 connected to the lead 95 to terminals 2B and 2A, respectively, associated with the seven-megacycle channel carrier. The common control 41 further directs that the idle channel carrier of seven megacycles be applied to the modulator OPM and demodulator IPM associated with the called substation S30. A two-way communication connection is thereby established between the operator or distant central office and substation S30. Supervisory tones from appropriate ones of the ringing current source 89 and busy tone source 87 are applied in the manner hereinabove set forth.

It is to be understood that the above-described arrangements are illustrative of the application of the principles of the invention. Numerous other arrangements may be devised by those skilled in the art without departing from the spirit and scope of the invention.

What is claimed is:

1. A line concentration communication system comprising a central office, a plurality of substations, a first and a second transmission means for connecting said substations to said central office, said first and second transmission means having a plurality of pairs of carrier channels of the same frequency, the number of said pairs being less than said substations, means for generating a supervisory signal at each of said substations, means including a distinct pair of said channels for scanning said substations to detect said signals, and means responsive to said scanning and detecting means for establishing a communication path between said central office and a substation through said first and second means on an idle pair of said carrier channels.

2. A line concentration communication system in accordance with claim 1 wherein said last-mentioned means includes switching means for selectively electrically connecting said substations to said first and said second transmission means, said switching means including modulating means for electrically connecting said substation to said first transmission means and demodulating means for electrically connecting said substation to said second transmission means.

3. A line concentration communication system in accordance with claim 2 further comprising means in said central office for generating identification signals unique to each of said substations and means remote from said central office and adjacent said substations responsive to said identification signals for applying the carrier frequency of said idle pair of carrier channels to said switching means of said substation identified by said identification signals to establish two-way communication between said substation and said central office.

4. In a line concentration carrier communication system, a plurality of substations, a central office remote from said substations, a first and a second broad-band high frequency transmission media for establishing two-way communication between a selected one of said plurality of substations and said central office, each of said pair of transmission media having a plurality of carrier channels less in number than the number of said substations, means at said central office responsive to the initiation of a call at one of said substations for selecting an idle one of said carrier channels in each of said transmission media, said selected channels adapted for intelligence transmission on a same carrier frequency, and means responsive to said same carrier frequency of said selected channels for electrically connecting said one substation to said central office by said selected channels of said first and second media for communication between said one substation and said central office.

5. In a line concentration carrier communication system, the combination set forth in claim 4 wherein said last-mentioned means includes modulating means connecting said one substation to said first transmission medium, demodulating means connecting said one substation to said second transmission medium, and means applying said same carrier frequency of said selected channels to said modulating and demodulating means.

6. In a carrier system, a plurality of substations, a central office location, a pair of broad-band communication mediums constituting a plurality of pairs of carrier channels less in number than said plurality of substations and a base-band channel, each of said pairs of carrier channels adapted for two-way intelligence transmission upon an identical channel carrier frequency, means responsive to the initiation of a call at one of said plurality of substations for selecting an idle pair of said carrier channels in said pair of communication mediums, means at said central office location for transmitting the identity of said one of said plurality of substations and said selected idle pair of carrier channels along said base-band channel, and means responsive to said transmission means to establish said two-way communication connection through said selected idle pair of corresponding channels between said one of said plurality of substations and said central office location.

7. In a carrier communication system, a central office location, a plurality of substations, broad-band transmission media each constituting a plurality of carrier channels, corresponding ones of said carrier channels in said media constituting a plurality of channel pairs having identical bandwidth allocation for the two-way transmission of intelligence, means for producing a plurality of high frequency carrier waves each corresponding to one of said plurality of channel pairs, means operative to produce an additional carrier frequency distinct from said plurality of high frequency carrier waves, means including modulating means for utilizing one of said plurality of channel pairs and a corresponding one of said high frequency carrier waves to provide two-way transmission of intelligence between said central office location and one of said plurality of substations, said utilizing means including additional modulating means at said one substation for doubly modulating at least a portion of the intelligence to be transmitted, and scanning means at said central office location responsive to said additional carrier frequency for determining the line condition of each of said plurality of substations.

8. In a communication system, a central office location, a plurality of substations, a pair of broad-band communication mediums constituting a plurality of corresponding carrier channels and a scan channel, said corresponding carrier channels in said pair of mediums constituting a channel pair adapted for transmission of intelligence modulated upon identical carrier frequencies in opposite directions, means for producing a plurality of high frequency carrier signals corresponding to each of said channels pairs and said scan channel, scanning means for utilizing said carrier signal corresponding to said scan channel for determining the line condition of one of said plurality of substations, means responsive to said scanning means for selecting an idle one of said channel pairs, and means for employing said carrier wave corresponding to said selected idle one of said channel pairs to effect two-way communication between one of said plurality of substations and said central office location.

9. In a communication system, a central office location, a plurality of substations, a pair of broad-band high frequency media interconnecting said central office location and said plurality of substations, each of said media constituting a plurality of carrier channels wherein corresponding ones of said carrier channels in each of said media are adapted for intelligence transmission upon identical carrier frequencies in opposite directions, means for producing a plurality of carrier waves associated with corresponding ones of said carrier channels in said media, means operative while one of said plurality of substations is in an off-hook condition to generate a frequency signal distinct from said produced carrier waves, scanning means responsive to said generated signal to determine the line condition of said one of said plurality of subscribers, means responsive to said scanning means for selecting an idle one of said produced carrier waves, dial means located at said one of said plurality of substations to interrupt said generated signal whereby an indication of a called party may be determined, means for utilizing said selected carrier wave to modulate said interrupted generated signal to provide transmission of said interrupted generated signal between said one of said plurality of substations and said central office location along corresponding ones of said channel carriers in said media associated with said selected carrier wave, and means at said central office location responsive to said interrupted generated signal.

10. In a communication system, a central office location, a plurality of substations each having an idle and service request condition, a pair of communication media interconnecting said central office location and said plurality of substations, said media comprising a plurality of corresponding carrier channels having identical transmission spectra for two-way communication between said central office location and said plurality of substations, means for producing a plurality of carrier waves associated with each of said transmission spectra, means at said central office location for detecting a service request condition at one of said plurality of substations, means at said central office location for determining an available one of said carrier waves, means at said central office location for generating a signal identifying said available one of said carrier waves and said one of said plurality of substations, switching means remote from said central office location responsive to said generating means to selectively apply said available carrier wave to said one of said plurality of substations, and means for utilizing said available one of said carrier waves to provide a two-way communication between said central office location and said one of said plurality of substations through said pair of communication mediums.

11. A telephone communication system, a central office location, a calling and a called subscriber substation, multichannel communication media interconnecting said central office location and each of said substations, said media constituting a plurality of corresponding carrier channels adapted for transmission upon identical carrier waves in opposite directions and a scan channel, means at said calling station for generating a signal indicative of a service request condition along said scan channel, means normally responsive to said transmitted signal for selecting available one of said plurality of corresponding carrier channels means responsive to said selecting means for establishing a two-way communication between said calling substation and said central office location along said selected one of said plurality of carrier channels, means for employing said generated signal to indicate the identity of said called substation, means at said central office location responsive to said employing means for further distributing said two-way communication from said central office location to said called substation, and means associated with said distributing means providing a two-way communication between said central office and said called station along a second selected one of said plurality of carrier channels.

12. In a communication system, a central office location, a plurality of subscriber substations, broad-band high frequency media constituting a scan channel and a plurality of corresponding carrier channels, each of said corresponding carrier channels having a same transmission spectrum for establishing a bidirectional communication connection between said central office location and selected ones of said plurality of substations, means at each of said plurality of substations for generating a frequency signal indicative of a service request condition, means for determining the presence of a service request condition at one of said plurality of substations, said determining means including means for transmitting said frequency signal along said scan channel, and means responsive to said determining means to utilize an available one of said corresponding carrier channels as a bidirectional communication connection between said one substation and said central office location, said utilizing means including means for employing said frequency signal as subcarrier frequency to provide an indication of the continuance of said service request condition.

13. In a communication system, a central office station, a plurality of substations each having idle and service request conditions, broad-band high frequency communication media to effect a two-way communication connection between said central office station and one of said plurality of stations in a service request condition, said media constituting a plurality of corresponding carrier channels less in number than said plurality of substations, each of said corresponding carrier channels having a same transmission spectrum, means for connecting said plurality of stations to each of said media, means for generating a plurality of carrier waves each individually associated with one of said plurality of corresponding carrier channels, means at said central office for detecting a service request condition at one of said plurality of substations, means at said central office station responsive to said detecting means for selecting an idle one of said plurality of corresponding carrier channels, means located at said one of said plurality of substations and controlled by said selecting means for receiving and transmitting message signals on that carrier wave associated with said selected idle one of said plurality of corresponding carrier channels, and means located at said central office station for receiving and transmitting message signals on that carrier wave associated with said selected idle one of said plurality of corresponding carrier channels.

14. In a communication system, a central office station, a plurality of subscriber substations, wide-band communication media constituting a plurality of carrier channel pairs less in number than said plurality of subscriber stations adapted for two-way communication between said central control station and selected ones of said plurality of stations, means at each of said plurality of stations for modulating message information to be communicated upon a subcarrier frequency, means associated with one of said plurality of substations for modulating said subcarrier modulated information upon a carrier frequency associated with one of said plurality of carrier channel pairs, means at said central office station for detecting the presence and absence of said subcarrier frequency to determine the line condition of said one of said plurality of stations, means at said central office station for modulating information upon a carrier frequency identical with said associated frequency, and receiving means at said central office station and said one of said plurality of substations for receiving said modulated information.

15. In a communication system, a central office station, a plurality of subscriber substations, wide-band communication media for establishing a two-way communication between said station and said plurality of substations, said media constituting a scan channel and a plurality of corresponding carrier channels, each of said corresponding carrier channels having a same predetermined frequency spectrum, means at each of said substations for generating a first carrier frequency to indicate a service request condition, means for cyclically scanning each of said substations for detecting said service request condition, said scanning means including means for modulating said first carrier frequency upon a second carrier frequency, means for utilizing said second carrier frequency as a carrier for the two-way transmission of intelligence along an available one of said plurality of carrier channels, means at each of said substations for independently modulating said first carrier frequency to produce dialing pulses, and means at said central control station responsive to said first carrier frequency for detecting said dialing pulses.

16. In a communication system, a central office station, a plurality of subscriber substations each including means for generating a first signal when in an off-hook condition, wide-band communication media for two-way intelligence communication between said central office station and said plurality of substations, each of said media having a predetermined spectrum assigned to said two-way intelligence communication constituting a plurality of pairs of carrier channels, scanning means for determining the call condition of each of said substations, said scanning means including means for modulating and transmitting said first signal upon a carrier signal, means at said central office station for detecting said carrier signal, means responsive to said detecting means to select an idle one of said plurality of pairs of carrier channels, means at said central station for transmitting an identity signal of said idle pair of carrier channels and said requesting substation outside said predetermined spectrum, means responsive to said identity signal to utilize a distinct carrier signal associated with said idle pair of carrier channels for establishing said two-way intelligence communication, said utilizing means operative to employ said first signal as a subcarrier for at least a part of the transmitted intelligence from said requesting substation, a plurality of filtering and detecting means at said central office station one for each of said plurality of pairs of carrier channels, said detecting means operative to recover said transmitted intelligence and provide an indication of said first signal, distribution means at said central office station for further directing said transmitted intelligence, and means responsive to said indication of said first signal to determine the said off-hook condition of said requesting substation.

17. In a carrier telephone system, central office equipment, a plurality of substations, each of said substations including means operative to transmit a subcarrier tone signal when in an off-hook condition, first modulating means at each of said plurality of substations for modulating at least a portion of the message information therefrom on said tone signal during said off-hook condition, broad-band communication media each constituting a plurality of carrier channel pairs adapted for broad-band intelligence communication in opposite direction upon a same carrier frequency, demodulating means and second modulating means connecting each of said plurality of substations to said communication media, means for periodically supervising the line condition of each of said substations, said supervising means being responsive to the presence of said subcarrier tone signal, a source of different carrier frequencies for each of said carrier channel pairs, switching means responsive to said supervising means for selectively applying to said demodulating means and said second modulating means that carrier frequency associated with an idle one of said carrier channels, means included in said central office equipment for monitoring the presence of said subcarrier signal to determine the duration of said off-hook condition, and means included in said central office equipment for receiving and transmitting said broad-band intelligence communication upon said associated carrier frequency.

18. In a carrier telephone system, a central office location, a plurality of substations, a pair of broad-band communication media common to said plurality of substations and connected to said central office location, said mediums constituting a plurality of carrier channels for two-way communication between said central office location and service requesting ones of said plurality of substations, corresponding carrier channels in each of said mediums constituting a carrier channel pair adapted for intelligence transmission upon identical channel carrier frequencies, modulating and demodulating means connecting each of said plurality of substations to an appropriate one of said media, said modulating means including means operative to double modulate at least a portion of the intelligence to be transmitted upon a second carrier, means operative to apply a carrier frequency associated with one of said carrier channels to said modulating and demodulating means associated with one of said plurality of substations, means at said central office location to receive and transmit signals upon said associated carrier frequency, and means responsive to the detection of said second carrier signal to determine the duration of said two-way communication.

References Cited in the file of this patent

UNITED STATES PATENTS

| | | |
|---|---|---|
| 2,731,512 | Levy | Jan. 17, 1956 |
| 2,754,367 | Levy | July 10, 1956 |
| 2,773,934 | Trousdale et al. | Dec. 11, 1956 |
| 2,802,057 | Ward | Aug. 6, 1957 |
| 2,947,818 | Ward | Aug. 2, 1960 |
| 2,951,907 | Marzin | Sept. 6, 1960 |